(12) United States Patent
Liu et al.

(10) Patent No.: US 9,255,813 B2
(45) Date of Patent: Feb. 9, 2016

(54) USER CONTROLLED REAL OBJECT DISAPPEARANCE IN A MIXED REALITY DISPLAY

(75) Inventors: James C. Liu, Bellevue, WA (US);
Stephen G. Latta, Seattle, WA (US);
Benjamin I. Vaught, Seattle, WA (US);
Christopher M. Novak, Redmond, WA (US); Darren Bennett, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1049 days.

(21) Appl. No.: 13/274,136

(22) Filed: Oct. 14, 2011

(65) Prior Publication Data

US 2013/0093788 A1  Apr. 18, 2013

(51) Int. Cl.
| | |
|---|---|
| G01C 21/36 | (2006.01) |
| G06F 3/01 | (2006.01) |
| G06F 3/03 | (2006.01) |
| G06T 19/00 | (2011.01) |

(Continued)

(52) U.S. Cl.
CPC ............ *G01C 21/365* (2013.01); *G02B 27/017* (2013.01); *G06F 3/011* (2013.01); *G06F 3/012* (2013.01); *G06F 3/013* (2013.01); *G06F 3/015* (2013.01); *G06F 3/017* (2013.01); *G06F 3/0304* (2013.01); *G06T 19/006* (2013.01); *H04N 5/272* (2013.01); *G02B 2027/014* (2013.01); *G02B 2027/0178* (2013.01)

(58) Field of Classification Search
CPC .................................................... G06T 19/006
See application file for complete search history.

(56) References Cited

U.S. PATENT DOCUMENTS

| 6,198,462 B1 | 3/2001 | Daily et al. |
| 6,734,853 B2 | 5/2004 | Heim et al. |

(Continued)

FOREIGN PATENT DOCUMENTS

| CN | 1914646 A | 2/2007 |
| CN | 101119443 A | 2/2008 |
| CN | 101119443 B | 1/2011 |

OTHER PUBLICATIONS

Marichal, Xavier, and Toshiyuki Umeda. "Real-time segmentation of video objects for mixed-reality interactive applications." Visual Communications and Image Processing 2003. International Society for Optics and Photonics, 2003.*

(Continued)

*Primary Examiner* — Zhengxi Liu
(74) *Attorney, Agent, or Firm* — Dan Choi; Judy Yee; Micky Minhas

(57) ABSTRACT

The technology causes disappearance of a real object in a field of view of a see-through, mixed reality display device system based on user disappearance criteria. Image data is tracked to the real object in the field of view of the see-through display for implementing an alteration technique on the real object causing its disappearance from the display. A real object may satisfy user disappearance criteria by being associated with subject matter that the user does not wish to see or by not satisfying relevance criteria for a current subject matter of interest to the user. In some embodiments, based on a 3D model of a location of the display device system, an alteration technique may be selected for a real object based on a visibility level associated with the position within the location. Image data for alteration may be prefetched based on a location of the display device system.

20 Claims, 22 Drawing Sheets

(51) Int. Cl.
　　G02B 27/01　　(2006.01)
　　H04N 5/272　　(2006.01)

(56) References Cited

U.S. PATENT DOCUMENTS

| | | | |
|---|---|---|---|
| 6,968,158 | B1 | 11/2005 | Bhuta et al. |
| 7,137,069 | B2 | 11/2006 | Abbott et al. |
| 7,475,088 | B2 | 1/2009 | Ziegler |
| 7,500,198 | B2 | 3/2009 | Mathews et al. |
| 7,848,765 | B2 | 12/2010 | Phillips et al. |
| 2003/0043147 | A1* | 3/2003 | Heim et al. ............... 345/421 |
| 2003/0146922 | A1 | 8/2003 | Navab et al. |
| 2003/0188150 | A1 | 10/2003 | Ohkado et al. |
| 2004/0002642 | A1* | 1/2004 | Dekel et al. ............... 600/407 |
| 2004/0131232 | A1 | 7/2004 | Meisner et al. |
| 2004/0183751 | A1 | 9/2004 | Dempski |
| 2005/0065968 | A1 | 3/2005 | Ziegler |
| 2006/0146012 | A1 | 7/2006 | Arneson et al. |
| 2006/0267997 | A1* | 11/2006 | Walls et al. ............... 345/581 |
| 2006/0277474 | A1 | 12/2006 | Robarts et al. |
| 2007/0273610 | A1 | 11/2007 | Baillot |
| 2008/0043013 | A1 | 2/2008 | Gruttadauria et al. |
| 2009/0144657 | A1 | 6/2009 | Zhang et al. |
| 2009/0195638 | A1 | 8/2009 | Caspi et al. |
| 2009/0243968 | A1 | 10/2009 | Nakazawa |
| 2010/0011297 | A1 | 1/2010 | Tsai et al. |
| 2010/0238161 | A1 | 9/2010 | Varga et al. |
| 2010/0253594 | A1 | 10/2010 | Szczerba et al. |
| 2010/0257252 | A1 | 10/2010 | Dougherty et al. |
| 2010/0269058 | A1 | 10/2010 | Othmer et al. |
| 2011/0002542 | A1 | 1/2011 | Adcock |
| 2011/0075257 | A1 | 3/2011 | Hua et al. |
| 2011/0161875 | A1 | 6/2011 | Kankainen |
| 2011/0179025 | A1* | 7/2011 | Chuang ............... 707/728 |
| 2011/0292076 | A1 | 12/2011 | Wither et al. |
| 2012/0019858 | A1 | 1/2012 | Sato |
| 2012/0131683 | A1 | 5/2012 | Nassar et al. |
| 2012/0270566 | A1* | 10/2012 | Persson ............... 455/456.3 |
| 2012/0299961 | A1 | 11/2012 | Ramkumar et al. |
| 2013/0073514 | A1* | 3/2013 | Cai et al. ............... 707/602 |
| 2013/0307874 | A1 | 11/2013 | Blanchflower et al. |
| 2013/0335301 | A1* | 12/2013 | Wong et al. ............... 345/8 |

OTHER PUBLICATIONS

Cheok et al. "Magic Land—a mixed reality interactive system integrating 3D live persons." Singapore Mixed Reality Lab, 2004.*
Avery, Benjamin, et al. "Evaluation of user satisfaction and learnability for outdoor augmented reality gaming." Proceedings of the 7th Australasian User interface conference—vol. 50. Australian Computer Society, Inc., 2006.*
Cipollo, Diane, "Photoshop Selection Tools and Content-Aware," BellaOnline—The Voice of Women [online], [retrieved on May 3, 2011], Retrieved from the Internet: URL <http://www.bellaonline.com/articles/art68100.asp>, 3 pages.
"Digital Skin Innovative Digital Solutions," digital-skin.net [online], Copyright 2010 [retrieved on May 17, 2011], Retrieved from the Internet: <URL:http://www.digital-skin.net/>, 3 pages.
"Diminished Reality—Remove objects from video on the fly," Tech Tips [online], Oct. 21, 2010 [retrieved on May 3, 2011], Retrieved from the Internet: URL: <http://techattitude.com/tools-and-softwares/diminished-reality-remove-objects-from-video-on-the-fly/>, 3 pages.
Hunter, Viola,"How to Remove an Unwanted Object from a Video," associatedcontent [online], Jun. 23, 2009 [retrieved on May 3, 2011], Retrieved from the Internet: URL <http://www.associatedcontent.com/article/1840997/how_to_remove_an_unwanted_object_from_pg2.html?cat=15>, 2 pages.
Moore, Antoni, "Cubes, shadows and comic strips—a.k.a. Interfaces, metaphors and maps?," Proceedings of the 16th Annual Colloquium of the Spatial Information Research Centre (SIRC 2004). Nov. 29-30, 2004, Dunedin, New Zealand, 5 pages.
Rehman et al., "Visually Interactive Location-Aware Computing," Proceedings of the Seventh International Conference on Ubiquitous Computing (UbiComp '05), Sep. 11-14, 2005, pp. 177-194, Springer-Verlag Berlin Heidelberg, 18 pages.
"What is skin?," Definition from WhatIs.com [online], Copyright 2008 [retrieved on May 17, 2011], Retrieved from the Internet: <URL:http://whatis.techtarget.com/definition/0,,sid9_gci213718,00.html>, 3 pages.
U.S. Appl. No. 13/214,037, filed Aug. 19, 2011.
Office Action dated Jan. 16, 2014 in U.S. Appl. No. 13/214,037, 45 pages.
Response to Office Action filed Apr. 16, 2014 in U.S. Appl. No. 13/214,037, 13 pages.
International Search Report and Written Opinion of the International Searching Authority, dated Dec. 28, 2012 in International Patent Application No. PCT/US2012/051517, 8 pages.
International Search Report and Written Opinion of the International Searching Authority, dated Dec. 10, 2012 in International Patent Application No. PCT/US2012/060144, 10 pages.
Office Action dated Jul. 10, 2014 in U.S. Appl. No. 13/214,037, 22 pages.
Response to Office Action filed Oct. 10, 2014, in U.S. Appl. No. 13/214,037, 10 pages.
Notice of Allowance dated October 24, 2014, in U.S. Appl. No. 13/214,037, 9 pages.
Office Action dated Jan. 19, 2015, in China, Patent Application No. 201210388564.8, 11 pages (includes English translation).
Response to Office Action filed on Jun. 2, 2015 (with English summary of response and claims) in Chinese Patent Application No. 201210388564.8, 18 pages.
Notice of Allowance with English translation dated Oct. 10, 2015 in Chinese Patent Application No. 201210388564.8, 8 pages.

* cited by examiner

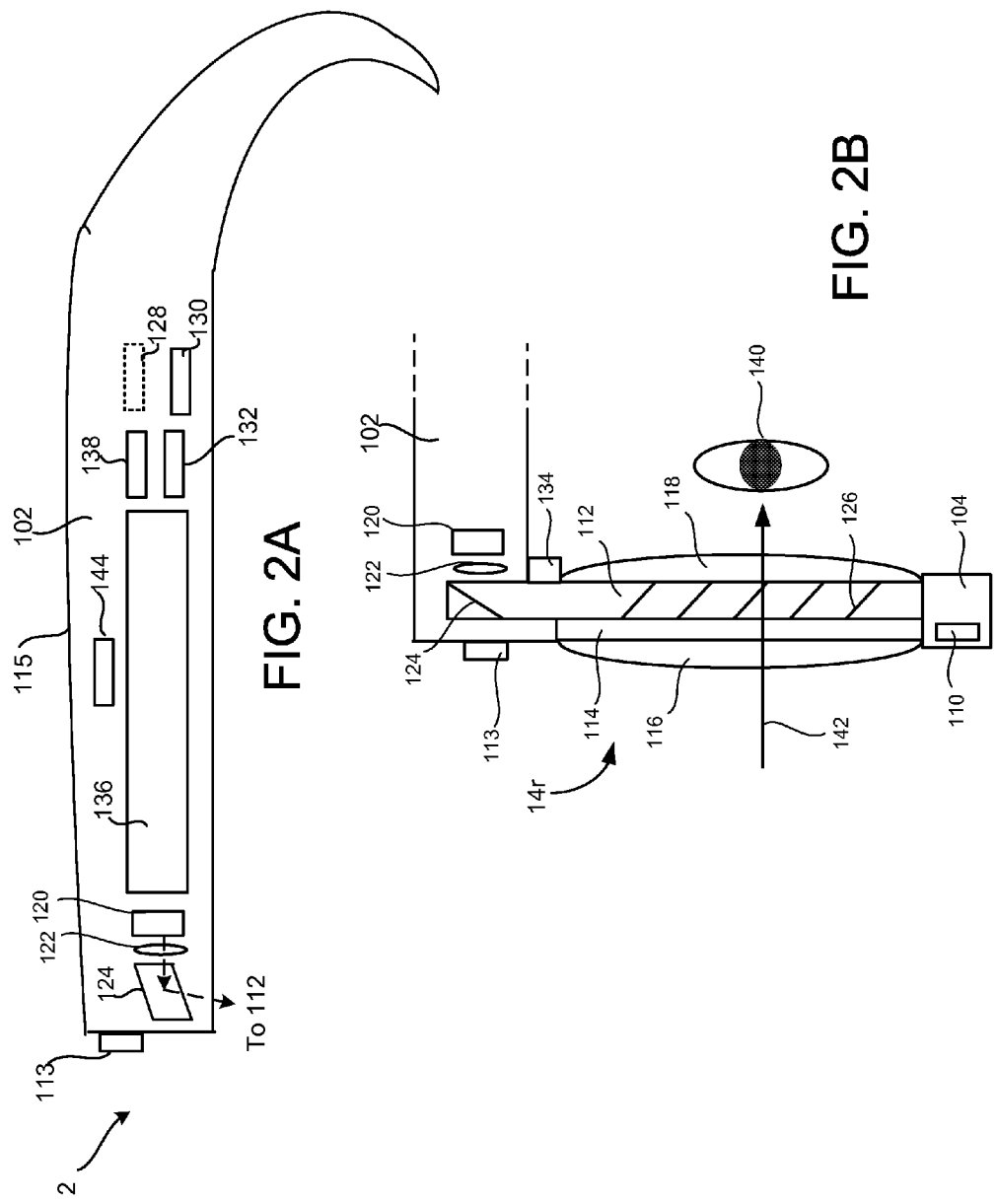

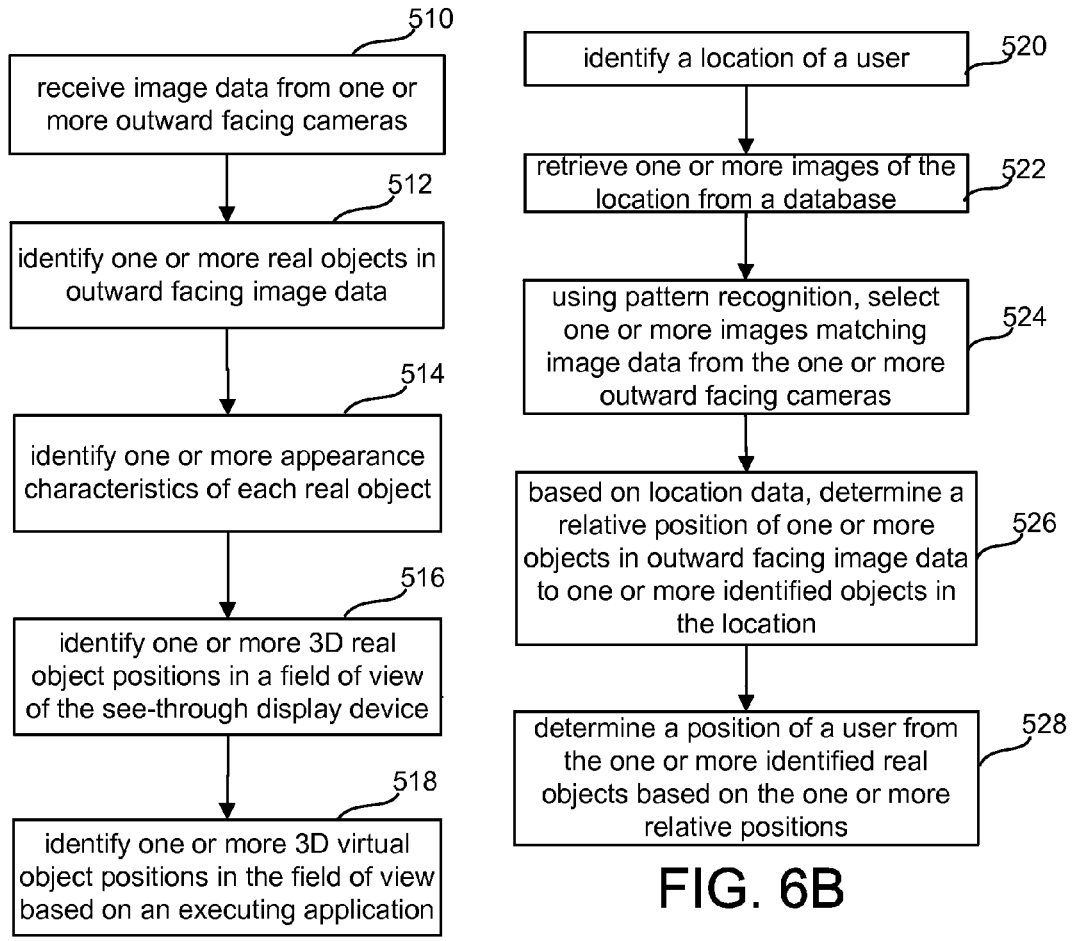
FIG. 6A
FIG. 6B
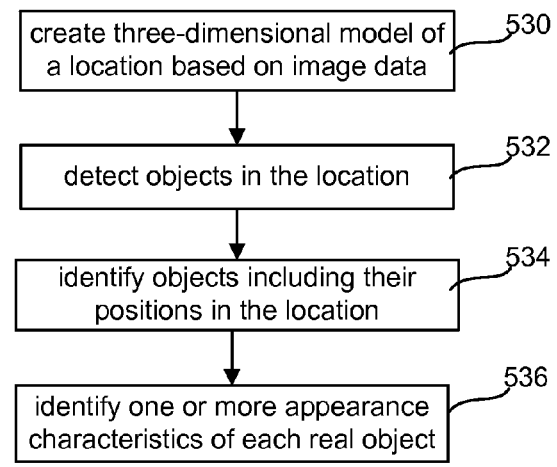
FIG. 6C

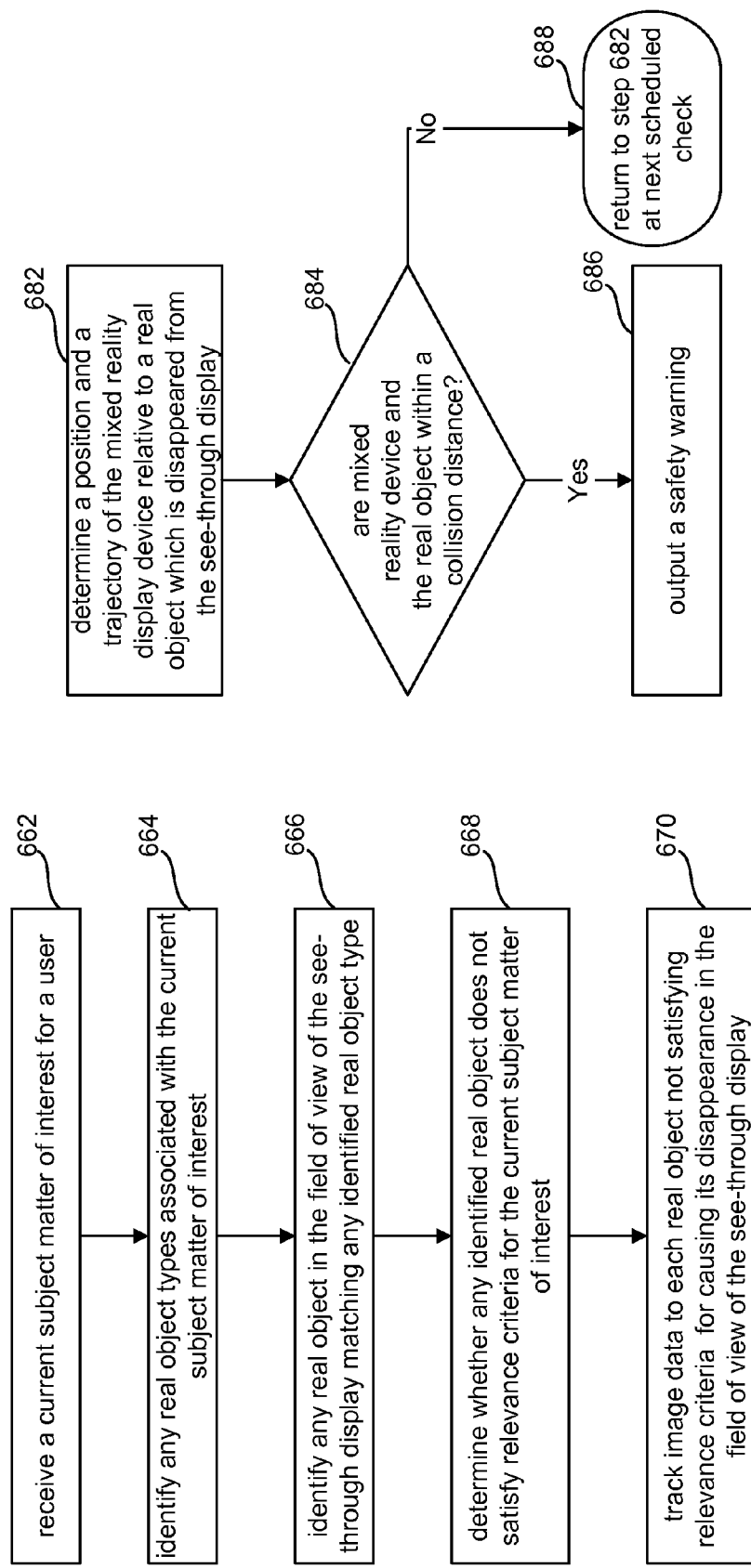

USER CONTROLLED REAL OBJECT DISAPPEARANCE IN A MIXED REALITY DISPLAY

BACKGROUND

Mixed reality, also referred to as augmented reality, is a technology that allows virtual imagery to be mixed with a real world view. A feature of a see-through, mixed or augmented reality display device unlike other display devices is that the images displayed do not monopolize the user's view. When a user looks at a computer screen of a laptop, desktop computer or smartphone, software executing on the processor generates what is viewed on one hundred percent of the computer screen. The user's view is diverted from the real world when looking at the computer screen. With a see-through, mixed reality display device, the user can see through the display and interact with the real world while also seeing images generated by one or more software applications. One may say there is shared control of the display by the executing software and the people and things the user sees, which are not under computer control.

SUMMARY

In embodiments described below, a see-through, head mounted mixed reality display device system causes a real world object to disappear from a field of view of the device due to the real world object's relation to a particular user associated subject matter. The subject matter may be identified as that to be avoided in some examples. A real world object may also disappear due to its degree of relevance to a current subject matter of interest to a user.

The technology provides an embodiment of one or more processor readable storage devices having instructions encoded thereon for causing one or more processors to execute a method for causing disappearance of a real object in a see-through display of a see-through, mixed reality display device system. The method comprises receiving metadata identifying one or more real objects in a field of view of the see-through display. For example, the one or more real objects may be identified based on image data captured by one or more physical environment facing cameras attached to the see-through, mixed reality display device system. It is determined whether any of the one or more real objects satisfies user disappearance criteria. Responsive to determining a real object satisfies the user disappearance criteria, the image data is tracked to the real object in the see-through display for causing the disappearance of the real object in the field of view of the see-through display. The content of the image data is based upon an alteration technique assigned to the real object.

The technology provides an embodiment of a see-through, head mounted, mixed reality display device system for causing disappearance of a real object in a field of view of see-through display of the display device system. The system comprises one or more location detection sensors and a memory for storing user disappearance criteria including at least one subject matter item. One or more processors have access to the memory and are communicatively coupled to the one or more location detection sensors for receiving location identifier data for the display device system. The one or more processors identify one or more real objects in the field of view of the see-through display which are related to the at least one subject matter item and within a predetermined visibility distance for a location determined from the location identifier data. At least one image generation unit is communicatively coupled to the one or more processors and optically coupled to the see-through display for tracking image data to the identified one or more real objects in the field of view of the see-through display for causing disappearance of the one or more real objects.

The technology provides an embodiment of a method for causing disappearance of a real object in a field of view of a see-through display of a see-through, mixed reality display device system. The method comprises receiving user input of a physical action identifying subject matter for disappearance including a real object for disappearance which is currently in the field of view of the see-through display. The subject matter for disappearance is stored in user disappearance criteria. Image data is tracked to the real object for disappearance in accordance with an alteration technique. Responsive to identifying a user designated alteration technique to be applied to the real object for disappearance currently in the field of view, selecting the user designated alteration technique as the alteration technique.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is a side view of an eyeglass temple of the frame of in an embodiment of the see-through, mixed reality display device embodied as eyeglasses providing support for hardware and software components.

FIG. 2B is a top view of an embodiment of a display optical system of a see-through, near-eye, mixed reality device.

FIG. 6A is a flowchart of an embodiment of a method for determining positions of real and virtual objects in a three-dimensional field of view of the display device system.

FIG. 6B is a flowchart of an embodiment of a method for identifying one or more real objects in a field of view of the display device.

FIG. 6C is a flowchart of an embodiment of a method for generating a three-dimensional model of a location.

FIG. 11 is a flowchart of an embodiment of another method for causing disappearance of a real object in a field of view of a see-through, mixed reality display device system based on a current subject matter of interest.

FIG. 12 is a flowchart of an embodiment of a process for providing a collision warning to a user with respect to a disappeared real object.

DETAILED DESCRIPTION

Figure 1A:
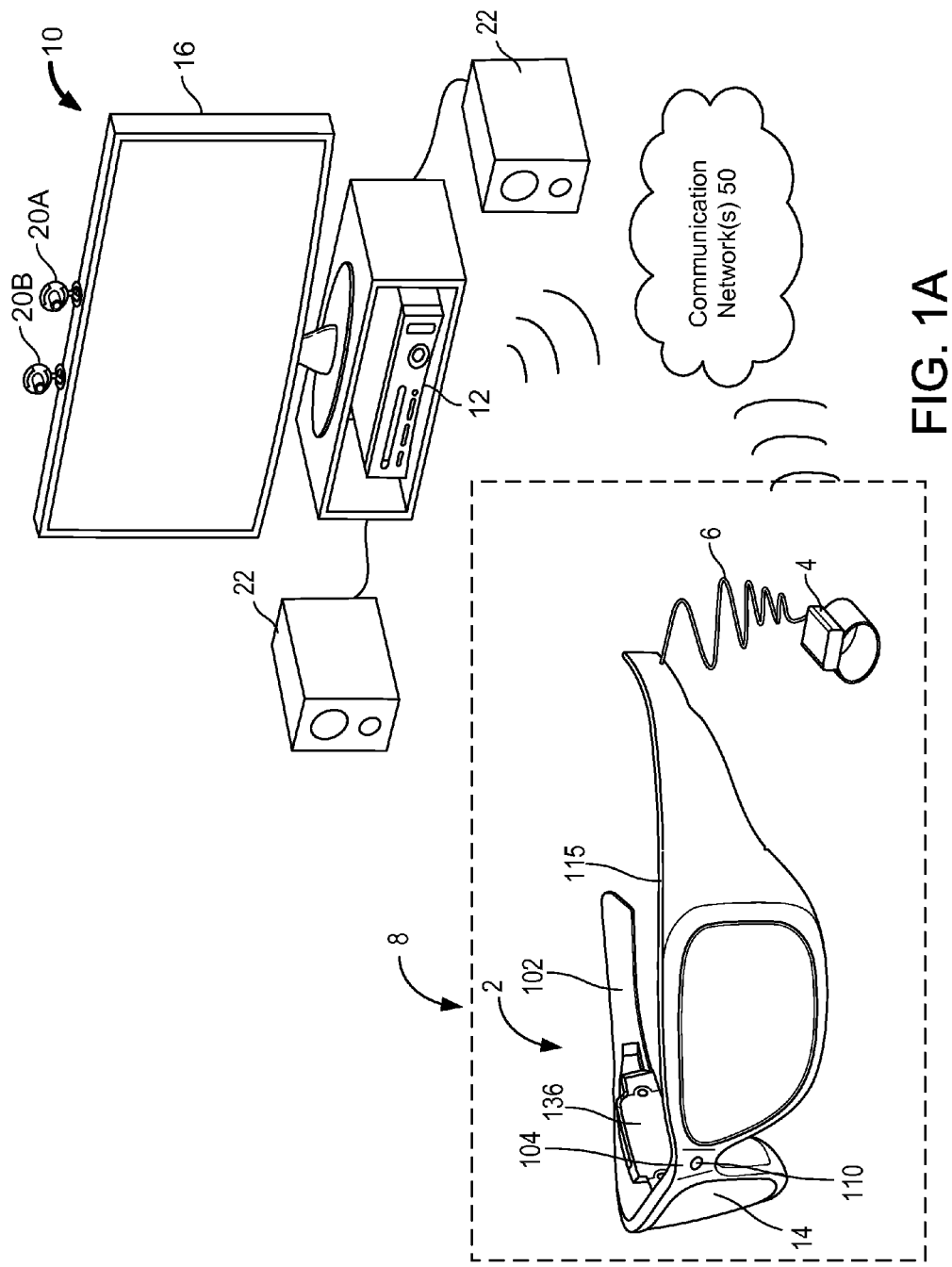
FIG. 1A is a block diagram depicting example components of one embodiment of a see-through, mixed reality display device system.

The technology provides various embodiments for causing disappearance of a real object in a see-through display of a mixed reality display device system. The term object, as in other image processing applications, may refer to a person or thing. For example, edge detection may be applied to a person or a thing in image data as part of a pattern recognition process for identifying what is in the image. As noted above, with a see-through, mixed reality display device, the user can literally see through the display and interact with the real world while also seeing images generated by one or more software applications.

A software application executing on the display device system identifies user disappearance criteria. In some examples, the user disappearance criteria may be based on user input which specifically identifies subject matter items for which a user does not want to see related objects. In some examples, subject matter may be a category or general topic which may be embodied across different types of objects. For example, identified subject matter may be a type of people such as clowns. In another example, the subject matter may be a type of tree. In other examples, a subject matter item may be referring to a specific object or group of objects. For instance, the subject matter may be a specific person, such as one's nine year old brother, or a specific thing, such as a cell tower in a specific location which has ruined a view of scenery. In another example, the subject matter may be a specific person, place, or thing to which different types of objects relate. An example of such a specific thing is a specific restaurant chain. Some examples of related objects are a person when dressed in an employee uniform of the chain, a billboard advertising the chain, a roadside sign for the chain, or a building housing one of the chain restaurants.

In some embodiments, user disappearance criteria may be determined based on a current subject matter of interest to a user. In order to emphasize information for the current subject matter of interest, objects not satisfying a relevance criteria for the current subject matter of interest are made to disappear from the display.

As described further below, image data is positioned in the see-through display over at least a part of a real object which is related to a subject matter item in a field of view of the see-through display. As either the user's head, body or eye gaze may change, or a position of the real object may change or both may change, the overlaid image data tracks the position of the disappearing real object with respect to the field of view of the see-through display.

To make an object disappear, different alteration techniques may be employed. Some techniques can be a simple redaction effect of covering the real object with black image data or obscuring the real object by tracking blurry image data to the object. Other techniques may involve replacing the real object with a virtual different type of object in the display. For example, if a clown is to be blocked, an avatar which tracks the movement of the real life clown may be displayed in the see-through display. In other examples, an erasure technique may be employed. One example of an implementation technique for an erasure technique is displaying image data of what is behind the real object to cover the real object in the see-through display. In another implementation example for an erasure technique, image data is generated by replicating image data of objects which surround the real object. The image data is displayed to cover the real object, effectively blending the real object out of the field of view of the display. In some embodiments, a position of a real object satisfying user disappearance criteria within a predetermined visibility distance of the see-through display is a basis for selecting an alteration technique for the real object.

Particularly, in the use of erasure techniques, some embodiments provide a collision avoidance safety feature by tracking a position or trajectory of the see-through, mixed reality display device and a relative position or trajectory of the "erased" real object and outputs a safety warning if the "erased" real object and the display device fall within a collision distance.

FIG. 1A is a block diagram depicting example components of one embodiment of a see-through, mixed reality display device system. System 8 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infrared, RFID transmission, wireless Universal Serial Bus (WUSB), cellular, 3G, 4G or other wireless communication means) over a communication network 50 to one or more computing systems 12 whether located nearby as in this example or at a remote location. In other embodiments, the functionality of the processing unit 4 may be integrated in software and hardware components of the display device 2.

Head mounted display device 2, which in this embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display. Therefore, each display optical system 14 is a see-through display for its respective eye, and the two display optical systems 14 together may also be referred to as a see-through display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Computing system 12 may be a computer, a gaming system or console, or a combination of one or more of these. An application may be executing on computing system 12, or may be executing in the see-through, mixed reality display system 8.

In this embodiment, computing system 12 is communicatively coupled to one or more capture devices 20A and 20B. In other embodiments, more or less than two capture devices can be used to capture the room or other physical environment of the user. Capture devices 20A and 20B may be, for example, cameras that visually monitor one or more users and the surrounding space such that gestures and/or movements performed by the one or more users, as well as the structure of the surrounding space, may be captured, analyzed, and tracked. A gesture acts as one or more controls or actions within an application and/or to animate an avatar or on-screen character.

Capture devices 20A and 20B may be depth cameras. According to an example embodiment, each capture device 20A, 20B may be configured to capture video with depth information including a depth image that may include depth values via any suitable technique including, for example, time-of-flight, structured light, stereo image, or the like. According to one embodiment, the capture device 20A, 20B may organize the depth information into "Z layers," or layers that may be perpendicular to a Z axis extending from the depth camera along its line of sight. The capture device 20A, 20B may include an image camera component which may include an IR light component, a three-dimensional (3-D) camera, and an RGB camera that may be used to capture the depth image of a scene. The depth image may include a two-dimensional (2-D) pixel area of the captured scene where each pixel in the 2-D pixel area may represent a length in, for example, centimeters, millimeters, or the like of an object in the captured scene from the camera.

Each capture device, 20A and 20B, may also include a microphone (not shown). Computing system 12 may be connected to an audiovisual device 16 such as a television, a monitor, a high-definition television (HDTV), or the like that may provide game or application visuals. In some instances, the audiovisual device 16 may be a three-dimensional display device. In one example, audiovisual device 16 includes internal speakers. In other embodiments, audiovisual device 16, a separate stereo or computing system 12 is connected to external speakers 22.

Figure 1B:
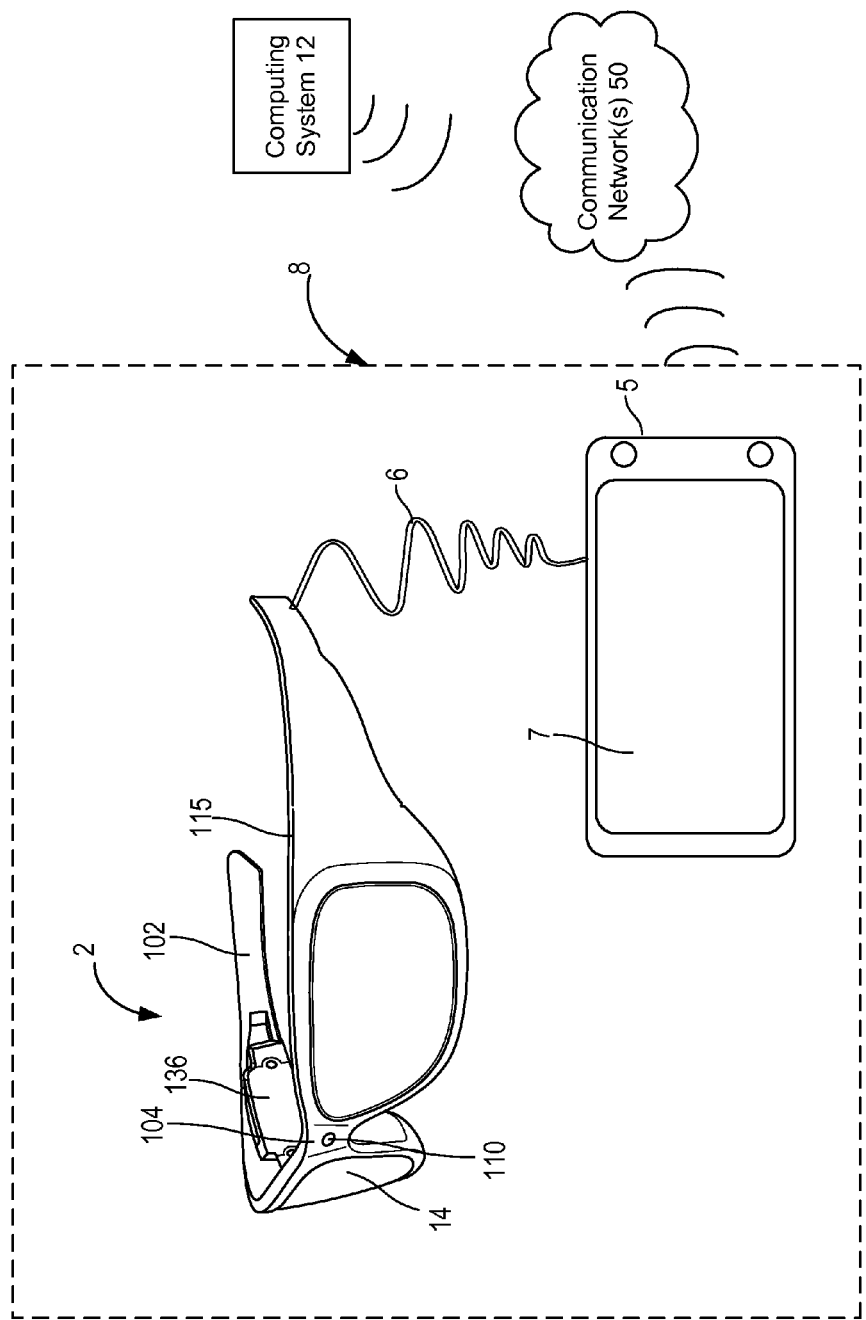
FIG. 1B is a block diagram depicting example components of another embodiment of a see-through, mixed reality display device system.

FIG. 1B is a block diagram depicting example components of another embodiment of a see-through, mixed reality display device system 8 which may communicate over a communication network 50 with other devices. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the computing system 12, applications like a disappearance application (see 456 below) may execute on a processor of the mobile device 5 which user actions control and which may display image data by the display optical systems 14. A display 7 of the mobile device 5 may also display data, for example menus, for executing applications and be touch sensitive for accepting user input. The mobile device 5 also provides a network interface for communicating with other computing devices like computing system 12 over the Internet 50 or via another communication network 50 (e.g. WiFi, Bluetooth, infrared, RFID transmission, WUSB, cellular, 3G, 4G or other wireless communication means) via a wired or wireless communication medium using a wired or wireless communication protocol. A remote network accessible computer system like computing system 12 may be leveraged for processing power and remote data access by a processing unit 4 like mobile device 5. Examples of hardware and software components of a mobile device 5 such as may be embodied in a smartphone or tablet computing device are described in FIG. 17, and these components can embody the hardware and software components of a processing unit 4 such as those discussed in the embodiment of FIG. 3B. Some other examples of mobile devices 5 are a smartphone, a laptop, or notebook computer and a netbook computer.

FIG. 2A is a side view of an eyeglass temple 102 of the frame 115 in an embodiment of the see-through, mixed reality display device embodied as eyeglasses providing support for hardware and software components. At the front of frame 115 is physical environment facing video camera 113 that can capture video and still images which are transmitted to the processing unit 4,5. Particularly in some embodiments where the display device 2 is not operating in conjunction with depth cameras like capture devices 20a and 20b of the system 12, the physical environment facing camera 113 may be a depth camera as well as a visible light sensitive camera. The camera may include one or more depth sensors and corresponding infrared illuminators as well as visible light detectors. Other examples of detectors that may be included in the camera 113 on the head mounted display device 2 without limitation, are SONAR, LIDAR, Structured Light, and/or Time of Flight distance detectors positioned to detect an object that a wearer of the device may be viewing.

The data from the camera may be sent to a processor 210 of the control circuitry 136, or the processing unit 4,5 or both, which may process them but which the unit 4,5 may also send to one or more computer systems 12 over a network 50 for processing. The processing identifies and maps the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIG. 3A. Inside, or mounted to temple 102, are ear phones 130, inertial sensors 132, one or more location sensors 144, e.g. a GPS transceiver, an infrared (IR) transceiver, optional electrical impulse sensor 128 for detecting commands via eye movements and temperature sensor 138. In one embodiment, inertial sensors 132 include a three axis magnetometer 132A, three axis gyro 132B and three axis accelerometer 132C (See FIG. 3A). The inertial sensors are for sensing position, orientation, and sudden accelerations of head mounted display device 2. From these movements, head position may also be determined.

Mounted to or inside temple 102 is an image source or image generation unit 120. In one embodiment, the image source includes micro display 120 for projecting images of one or more virtual objects and lens system 122 for directing images from micro display 120 into light guide optical element 112. Lens system 122 may include one or more lenses. In one embodiment, lens system 122 includes one or more collimating lenses. In the illustrated example, a reflecting element 124 of light guide optical element 112 receives the images directed by the lens system 122.

There are different image generation technologies that can be used to implement micro display 120. For example, micro display 120 can be implemented using a transmissive projection technology where the light source is modulated by optically active material, backlit with white light. Micro display 120 can also be implemented using a reflective technology for which external light is reflected and modulated by an optically active material. Digital light processing (DLP), liquid crystal on silicon (LCOS) and Mirasol® display technology from Qualcomm, inc. are all examples of reflective technologies. Additionally, micro display 120 can be implemented using an emissive technology where light is generated by the display, see for example, a PicoP™ display engine from Microvision, Inc.

FIG. 2B is a top view of an embodiment of a display optical system 14 of a see-through, near-eye, mixed reality device. A portion of the frame 115 of the near-eye display device 2 will surround a display optical system 14 for providing support for one or more lenses as illustrated and making electrical connections. In order to show the components of the display optical system 14, in this case 14r for the right eye system, in the head mounted display device 2, a portion of the frame 115 surrounding the display optical system is not depicted.

In one embodiment, the display optical system 14 includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112.

See-through lenses 116 and 118 are standard lenses used in eye glasses and can be made to any prescription (including no prescription). In some embodiments, head mounted display device 2 will include only one see-through lens or no see-through lenses. Opacity filter 114 filters out natural light (either on a per pixel basis or uniformly) to enhance the contrast of the virtual imagery. Light guide optical element 112 channels artificial light to the eye. More details of the light guide optical element 112 and opacity filter 114 are provided below.

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142 representing an optical axis of the display optical system 14r, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. In one example, 100% transmissivity represents a perfectly clear lens. An "alpha" scale can be defined from 0-100%, where 0% allows no light to pass and 100% allows all light to pass. The value of alpha can be set for each pixel by the opacity filter control unit 224 described below. A mask of alpha values can be used from a rendering pipeline, after z-buffering with proxies for real-world objects.

When the system renders a scene for the mixed reality display, it takes note of which real-world objects are in front of which virtual objects. In one embodiment, the display and the opacity filter are rendered simultaneously and are calibrated to a user's precise position in space to compensate for angle-offset issues. Eye tracking can be employed to compute the correct image offset at the extremities of the viewing field. If a virtual object is in front of a real-world object, then the opacity is turned on for the coverage area of the virtual object. If the virtual object is (virtually) behind a real-world object, then the opacity is turned off, as well as any color for that pixel, so the user will only see the real-world object for that corresponding area (a pixel or more in size) of real light. Coverage may be on a pixel-by-pixel basis, so the system could handle the case of part of a virtual object being in front of a real-world object, part of the virtual object being behind the real-world object, and part of the virtual object being coincident with the real-world object. The opacity filter assists the image of a virtual object to appear more realistic and represent a full range of colors and intensities. More details of an opacity filter are provided in U.S. patent application Ser. No. 12/887,426, "Opacity Filter For See-Through Mounted Display," filed on Sep. 21, 2010, incorporated herein by reference in its entirety.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (see FIG. 2B), which will include an eye tracking illumination device 134A and eye tracking camera 134B (see FIG. 3A).

In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately. Alternatively, an eye tracking camera may be an alternative form of tracking camera using any motion based image of the eye to detect position, with or without an illumination source.

Another embodiment for tracking eye movements is based on charge tracking. This concept is based on the observation that a retina carries a measurable positive charge and the cornea has a negative charge. Sensors 128, in some embodiments, are mounted by the user's ears (near earphones 130) to detect the electrical potential while the eyes move around and effectively read out what the eyes are doing in real time. (See Control your mobile music with eyeball-activated earphones!, Feb. 19, 2010 [retrieved from the Internet Jul. 12, 2011: http://www.wirefresh.com/control-your-mobile-music-with-eyeball-actvated-headphones].) Eye blinks may also be tracked as commands. Other embodiments for tracking eyes movements, such as blinks, which are based on pattern and motion recognition in image data from the eye tracking camera 134B mounted on the inside of the glasses, can also be used.

In the embodiments above, the specific number of lenses shown are just examples. Other numbers and configurations of lenses operating on the same principles may be used. Additionally, FIGS. 2A and 2B only show half of the head mounted display device 2. A full head mounted display device would include another set of see through lenses 116 and 118, another opacity filter 114, another light guide optical element 112, another micro display 120, another lens system 122 physical environment facing camera 113 (also referred to as outward facing or front facing camera 113), eye tracking assembly 134, earphone 130, sensor 128 if present and temperature sensor 138. Additional details of a head mounted display 2 are illustrated in U.S. patent application Ser. No. 12/905,952 entitled Fusing Virtual Content Into Real Content, Filed Oct. 15, 2010, fully incorporated herein by reference.

Figure 3A:
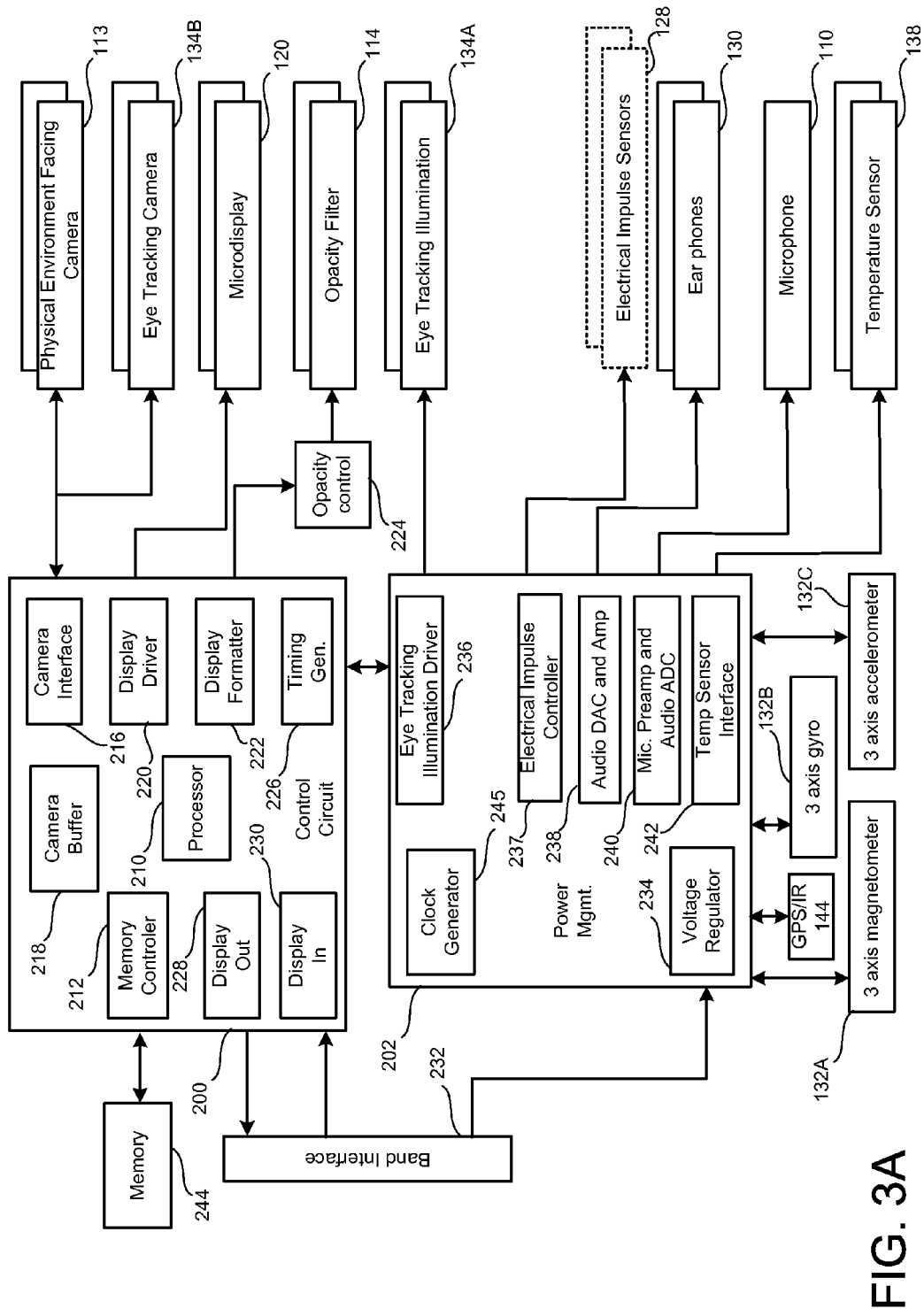
FIG. 3A is a block diagram of one embodiment of hardware and software components of a see-through, near-eye, mixed reality display device as may be used with one or more embodiments.
Figure 3B:
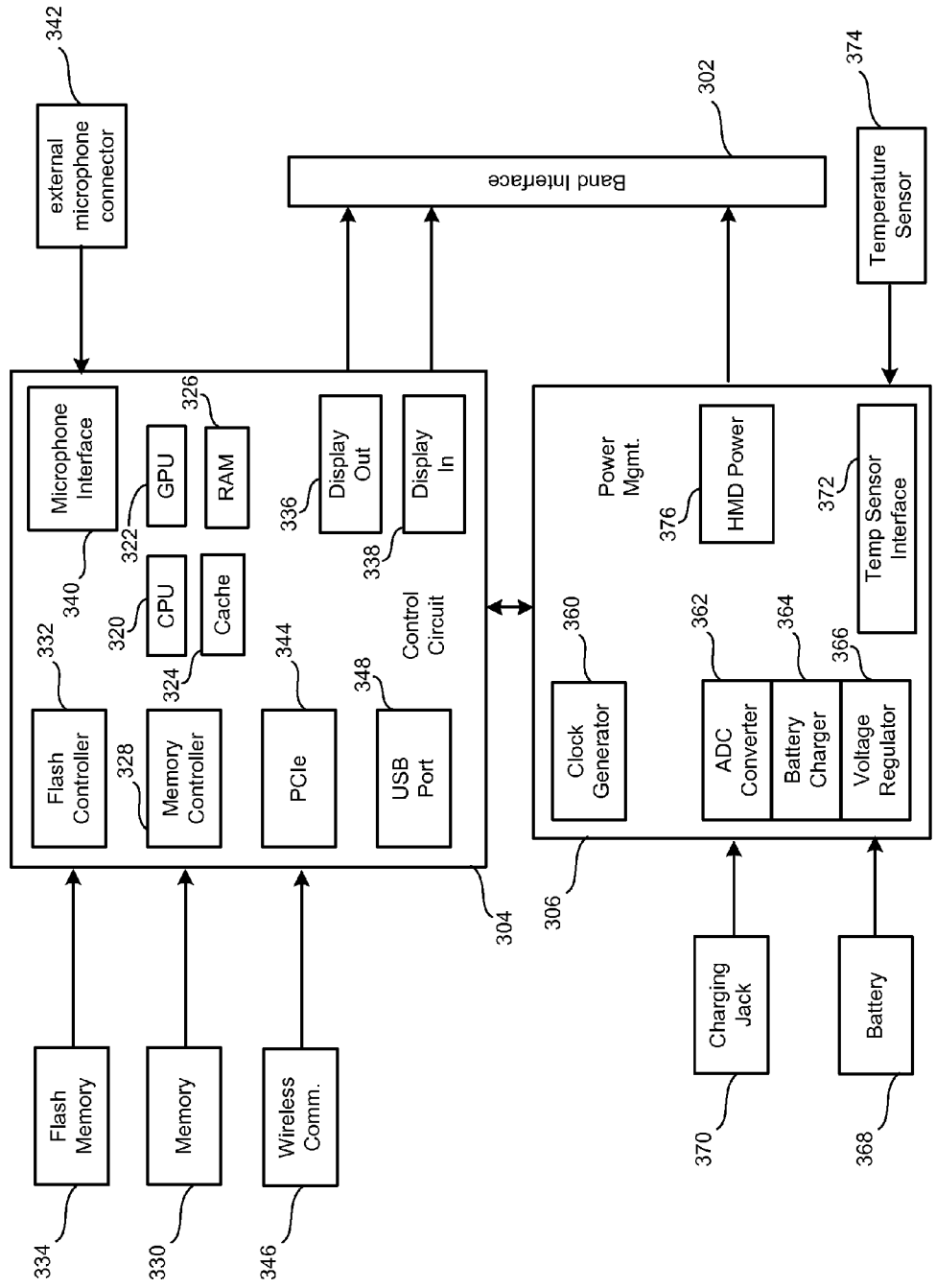
FIG. 3B is a block diagram describing the various components of a processing unit.

FIG. 3A is a block diagram of one embodiment of hardware and software components of a see-through, near-eye, mixed reality display device 2 as may be used with one or more embodiments. FIG. 3B is a block diagram describing the various components of a processing unit 4,5. In this embodiment, near-eye display device 2, receives instructions about a virtual image from processing unit 4,5 and provides data from sensors back to processing unit 4,5. Software and hardware components which may be embodied in a processing unit 4,5, for example as depicted in FIG. 3B, receive the sensory data from the display device 2 and may also receive sensory information from a computing system 12 over a network 50 (See FIGS. 1A and 1B). Based on that information, processing unit 4, 5 will determine where and when to provide a virtual image to the user and send instructions accordingly to the control circuitry 136 of the display device 2.

Note that some of the components of FIG. 3A (e.g., outward or physical environment facing camera 113, eye camera 134, micro display 120, opacity filter 114, eye tracking illumination unit 134A, earphones 130, sensors 128 if present, and temperature sensor 138 are shown in shadow to indicate that there are at least two of each of those devices, at least one for the left side and at least one for the right side of head mounted display device 2. FIG. 3A shows the control circuit 200 in communication with the power management circuit 202. Control circuit 200 includes processor 210, memory controller 212 in communication with memory 244 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the mixed reality system. The display formatter 222 can identify to the opacity control unit 224 transmissivity settings for which pixels of the display optical system 14. Timing generator 226 is used to provide timing data for the system.

Display out interface 228 includes a buffer for providing images from physical environment facing cameras 113 and the eye cameras 134 to the processing unit 4, 5. Display in interface 230 includes a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, audio DAC and amplifier 238, microphone preamplifier and audio ADC 240, temperature sensor interface 242, electrical impulse controller 237, and clock generator 245. Voltage regulator 234 receives power from processing unit 4,5 via band interface 232 and provides that power to the other components of head mounted display device 2. Illumination driver 236 controls, for example via a drive current or voltage, the eye tracking illumination unit 134A to operate about a predetermined wavelength or within a wavelength range. Audio DAC and amplifier 238 provides audio data to earphones 130. Microphone preamplifier and audio ADC 240 provides an interface for microphone 110. Temperature sensor interface 242 is an interface for temperature sensor 138. Electrical impulse controller 237 receives data indicating eye movements from the sensor 128 if implemented by the display device 2. Power management unit 202 also provides power and receives data back from three axis magnetometer 132A, three axis gyro 132B and three axis accelerometer 132C. Power management unit 202 also provides power and receives data back from and sends data to one or more location sensors 144, which include a GPS transceiver and an IR transceiver in this example.

FIG. 3B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 3B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, cellular, 3G, 4 G communication devices, wireless USB (WUSB) communication device, RFID communication device etc. The wireless communication component 346 thus allows peer-to-peer data transfers with for example, another display device system 8, as well as connection to a larger network via a wireless router or cell tower. The USB port can be used to dock the processing unit 4, 5 to another display device system 8. Additionally, the processing unit 4,5 can dock to another computing system 12 in order to load data or software onto processing unit 4, 5, as well as charge processing unit 4, 5. In one embodiment, CPU 320 and GPU 322 are the main workhorses for determining where, when and how to insert virtual images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

Image data may be applied to a real object identified in a location and which is within a user field of view of a see-through, mixed reality display device system. The location of real objects like people and things in the user's environment are tracked in order to track a virtual object to its intended real object. For image processing purposes, both a person and a thing may be an object, and an object may be a real object, something physically present, or a virtual object in an image displayed by the display device 2. Software executing on one or more of the hardware components discussed above use the data provided by sensors such as the camera, orientation sensors and the one or more location sensors and network connections to track real and virtual objects in a user's environment.

Typically, virtual objects are displayed in three dimensions so that just as a user interacts with real objects in three dimensions, the user may interact with virtual objects in three dimensions. FIGS. 4 through 12 discussed next describe embodiments of methods at different levels of detail, exemplary data structures and software components which process image data, user input and user disappearance criteria for causing real objects satisfying user disappearance criteria to disappear from the see-through display.

Figure 4:
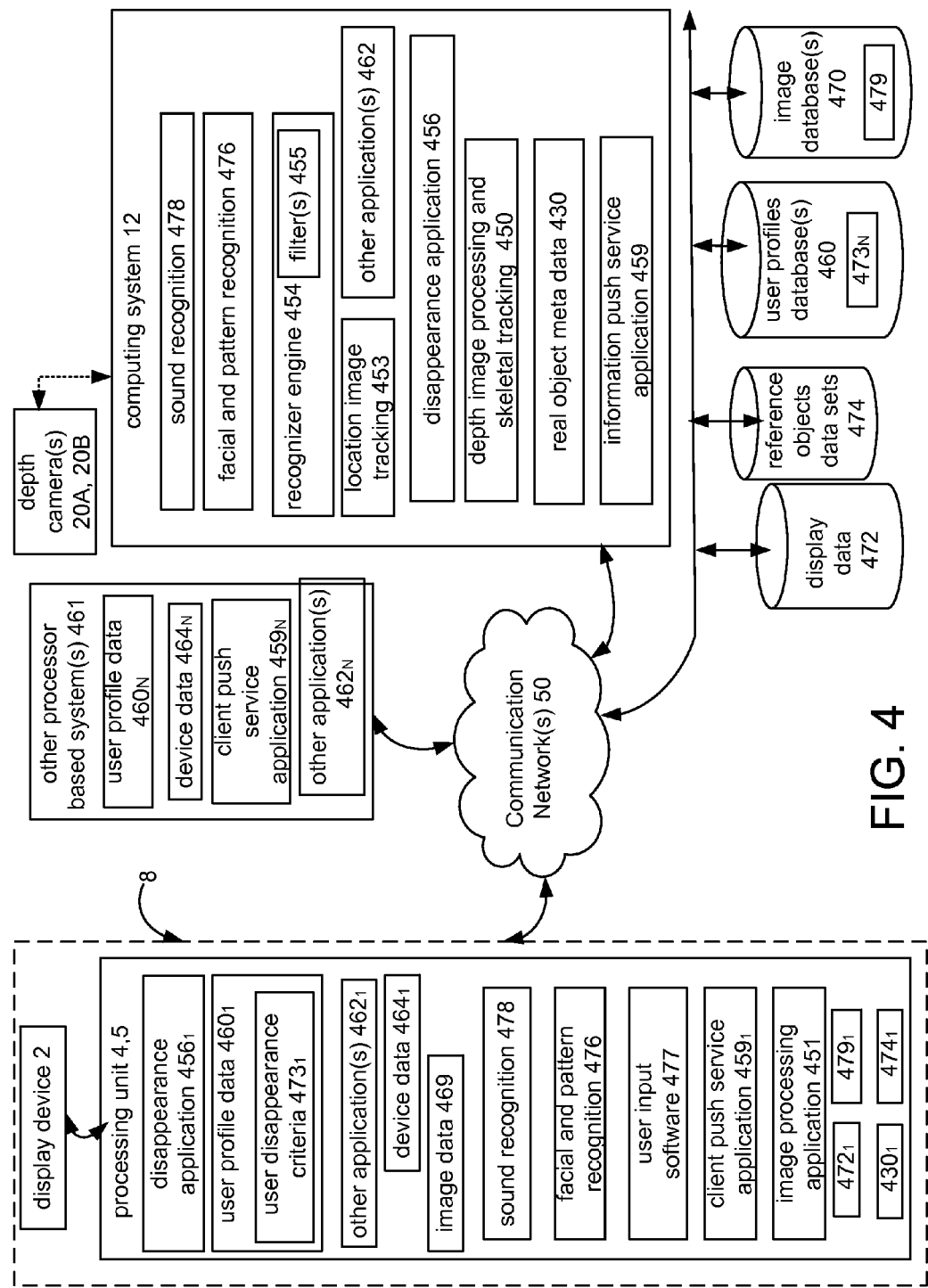
FIG. 4 is a block diagram of an embodiment of a system from a software perspective for causing disappearance of a real object in a display of a see-through, mixed reality display device system.

FIG. 4 is a block diagram of an embodiment of a system from a software perspective for causing disappearance of a real object in a display of a see-through, mixed reality display device system. In this embodiment, a see-through, mixed reality display device system 8 executing a version of a disappearance application as a client side or device disappearance application $456_1$ is communicatively coupled over a network 50 to a computing system 12 executing another version of the disappearance application as a server side disappearance application 456. In this embodiment, each of the local and server side versions of the different applications (disappearance 456, other applications 462, push service application 459, etc.) performs the same functions. The processing discussed can be performed entirely by the software and hardware components of the display device system 8. For example, the local disappearance application $456_1$ for the display system 8 can identify a real object for disappearance and track image data to it based on its local resources. The server side versions have more hardware resources available to them, such as larger local memory size and dedicated processors, than the local versions. In other examples, the server side disappearance application 456 performs the identification of and tracking of image data to a real object for disappearance remotely for the display device system 8. In other examples, the different versions leverage their resources and share the processing.

In this embodiment, each of the systems 8, 461 and 12 are communicatively coupled over one or more networks 50 to various databases discussed further below such as reference object data sets 474, image database(s) 470, and user profile databases 460.

Some examples of other processor based systems 461 are other see-through, mixed reality display device systems, other head mounted display systems, servers, mobile devices like mobile phones, smartphones, netbooks, notebooks, and the like and desktop computers. These other processor based systems 461 communicate with the display device system 8 to provide data in various multimedia formats like text, audio, image and video data, from one or more of its applications. For example, the data may be video of a friend at a same location at which the user is present, or a social networking page showing messages from others on the user's friend list. As discussed in examples below, such data may also be image disappearance data for a real object the sender does not wish to see. In this way, the recipient user can view a scene altered to obscure the sender's undesired real object from the recipient's field of view.

The display device system 8 and the other processor based systems 461 execute a client side version of a push service application $459_N$ which communicates over a communication network 50 with an information push service application 459. A user may register an account with the information push service application 459 which grants the information push service permission to monitor the user's executing applications and data generated and received by them as well as user profile data $460_N$, and device data $464_N$ for tracking the user's location and device capabilities.

In one embodiment, computing system 12 includes a user profile database 460 which may aggregate data from user profile data stored on the different user computer systems 8, 461 of the user. The local copies $460_1$, $460_N$ of the user profile data may store some of the same user profile data 460 and may periodically update their local copies with the user profile data 460 stored by the computer system 12 in an accessible database over a communication network 50. User disappearance criteria 473 may also be stored in user profile data 460. Subject matter for disappearance data 410 and a current subject matter of interest data 420 are both types of user disappearance criteria 473.

Figure 5A:
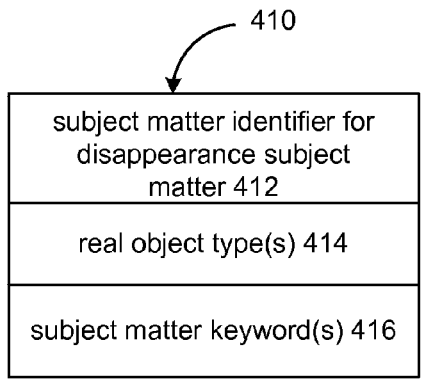
FIG. 5A illustrates an example of a disappearance subject matter item data record in user disappearance criteria.

FIG. 5A illustrates an example of a disappearance subject matter item data record 410 in user disappearance criteria 473. In this example, a subject matter identifier 412 may include an identifier of a person, place or thing, and the identifier may indicate a category or a type of person, place or thing. The identifier may also reference a specific person, place or thing. In some examples, the identifier may be a reference to a storage location of an image of a person, place or thing. For example, FIGS. 13A through 13D show an example of a gesture as user input indicating that a person be removed from the user's view of mountains. A user may not know the name of a person, place or thing she or he is looking at and which is requested to disappear, so the image storage location reference (e.g. file name) identifies image data as a basis for identifying the subject matter. Location information may also be a basis for subject matter identification.

The disappearance application 456, $456_1$ associates one or more real object types 414 with the subject matter identifier 412 based on the disappearance subject matter the identifier 412 represents. Similarly, the disappearance application 456 associates one or more subject matter keywords 416 with the subject matter identifier 412 in data record 410. For example, the disappearance application 456, $456_1$ may interface with a search application 462, $462_1$ for identifying synonyms and related words to the subject matter which the search application returns to the disappearance application 456, $456_1$. The keywords assist when looking for matches in real object metadata for any real object which satisfies user disappearance criteria. The subject matter identifier 412 and the keywords 416 can also identify real object types 414 related to the subject matter by looking for matches in reference object datasets. User input may identify a real object type 414 and a subject matter keyword 416 in some examples too.

Figure 5B:
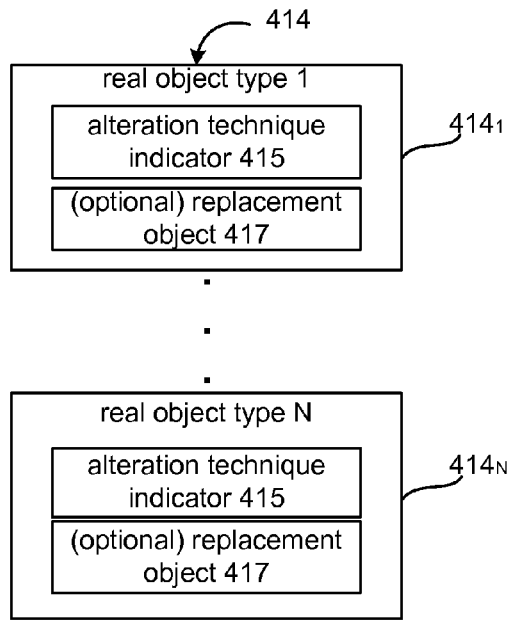
FIG. 5B illustrates examples of data fields in a real object type record of a subject matter item data record in user disappearance criteria.

FIG. 5B illustrates examples of data fields in a real object type record of a disappearance subject matter item data record 410 in user disappearance criteria 473. For each real object type 414, an alteration technique indicator 415 indicates an alteration technique for making the real object disappear. A user may indicate the alteration technique, and the application may provide one or more default alteration techniques. Some examples of alteration techniques include erasure, redaction, blurring and replacement with another object. If replacement is the indicated alteration technique, a user may optionally identify a replacement object 417, which may be specific or refer to a type of object. The replacement object 417 may store display data (see 472 below) for the replacement object or an identifier pointing to the display data. The display data may be an instantiation of a reference object data set 474 described below.

A user may indicate subject matter a user wishes to disappear, but a user may also indicate a current subject matter of interest. For a current subject matter of interest, one or more real object types of interest for that subject matter are identified. Relevancy criteria is applied to metadata (See FIG. 5C) describing a real object having a type, e.g. road sign, matching at least one of the real object types of interest. A real object of the one or more object types of interest is made to disappear if the real object does not satisfy the relevancy criteria. In some examples, user input may directly identify a current subject matter of interest, and the disappearance application 456, $456_1$ prompts the user via one or more electronically provided requests to identify one or more real object types for the current subject matter of interest. For example, a user may be interested in Chinese restaurants, and wishes to declutter her view of building signs on a busy street. However, having all real objects, including the street in front of her, disappear may be dangerous, and not helpful in locating a Chinese restaurant.

In some instances, the user has indicated a current subject matter of interest via another executing application 462, and that application communicates with the disappearance application 456, $456_1$ for identifying the current subject matter of interest, subject matter keywords, particularly those relevant to the application 462, and real object types of interest 424. For example, for a car navigation application example, different types of road signs may be identified as real object types of interest. The executing application selects the alteration indicator 414 and any applicable replacement object 417 too.

In some examples, the disappearance application 456 provides a software interface, for example, an application programming interface (API), which defines data formats for defining real object types 414, subject matter identifiers 412, subject matter keywords 416, and relevancy criteria 428, e.g. rules for determining relevancy.

Figure 5C:
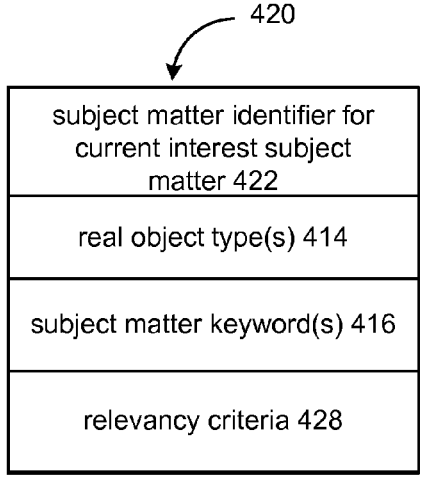
FIG. 5C illustrates an example of a current subject matter of interest item data record in user disappearance criteria.

FIG. 5C illustrates an example of a current subject matter item of interest data record 420 in user disappearance criteria data 473. A subject matter identifier 422 is assigned, and like for disappearance subject matter, the identifier 422 may be a reference to another storage location, identify a type of person, place or thing or be a reference to a specific person, place or thing. As discussed above, real object type data records 414 are stored and include an alteration technique indicator 415 and optionally a replacement object identifier 417. Similarly, one or more subject matter keywords 416 may be associated with the identifier 422, for example by requesting and receiving keywords from a search application 462. Furthermore, relevancy criteria 428 is assigned for the subject matter of interest. In some cases, relevancy criteria 428 may be rules provided by an executing application 462 through which the current subject matter of interest was identified. A set of default rules may also implement the relevancy criteria 428.

An example of logic implemented by the disappearance application for the set of default rules is that a real object have the same type as a real object type for current interest, and that the metadata of the real object include at least one of a subject matter keyword 416 or the subject matter identifier 422.

As for the example of FIG. 5B, the user may select an alteration technique and any applicable replacement object identifier in some instances. In other examples, an executing application 462, $462_1$ interfacing with the disappearance application 456, $456_1$ sets the alteration technique indicator 415 for selecting an alteration technique to be used for a real object type and sets any applicable replacement object 417.

In some instances, the subject matter item data record 410, 420 may be stored temporarily. An event trigger may prompt an electronically provided request to the user of whether he or she wishes to store the subject matter as disappearance subject matter or subject matter of interest in non-volatile memory for later retrieval. Some examples of event triggers are the object for disappearance is no longer in the field of view, the user has moved out of a location, or data has been received identifying the subject matter as being no longer of interest. A request is electronically provided when it is displayed, played as audio data or a combination of the two. Requests may also be electronically provided for alteration techniques and replacement object preferences. A default alteration technique and any replacement objects for the default technique may be selected if a user does not specify any.

Some other examples of user profile data are the user's expressed preferences, the user's friends' list, the user's preferred activities, a list of the user's reminders, the user's social groups, the user's current location, and other user created content, such as the user's photos, images and recorded videos. In one embodiment, the user-specific information may be obtained from one or more applications and data sources such as the user's social networking sites, address book, schedule data from a calendar application, email data, instant messaging data, user profiles or other sources on the Internet as well as data directly entered by the user.

Each version of the push service application 459 also stores in user profile data 460 a tracking history of the user. Some examples of events, people and things tracked in the tracking history are locations visited, transactions, content and real things purchased, and people detected with whom the user has interacted. If electronically identified friends (e.g. social networking friends, contact lists) are registered with the push service application 459 too, or they make information available through data to the user or publicly through other applications 466, the push service application 459 can use this data as well to track a social context for the user. The locations visited are tracked over time, and allow real objects for disappearance and their alteration image data to be stored, prefetched, and ready for download as the user nears a familiar location.

Location identifier data for the mixed reality device system 8 may be obtained based on one or more detection sensors. In some instances, the computing system 12 is in communication with detection sensors on the mixed reality device like the one or more transceivers 144. Data from one or more different types of location detection sensors may be used to obtain location identifier data as discussed in the following examples. Cell tower triangulation may be used based on signals from the processing unit 4, e.g. when it is embodied as a mobile device 5, to identify a location of a mixed reality display device system. Global Positioning System (GPS) data may be obtained from a GPS transceiver 144 of the display device, or as disclosed in FIG. 17, from GPS transceiver 965 in the processing unit 5 for identifying a location of a mixed reality device. GPS technology may be used to identify when a user has entered a geofence. A geofence identifier may be used to retrieve images of the area within the geofence, and in some cases a three dimensional model of the area generated from image data.

Locations or spaces of smaller area may also be delineated or fenced by other types of wireless detection sensors such as a wireless universal serial bus (WUSB) transceiver, a Bluetooth transceiver, RFID transceiver or an IR transceiver, e.g. 346, 144. Identification data may be exchanged with the computer system 12 or other computer systems 461 including other see-through mixed reality display device systems. In other examples, the computing system 12 communicates with an intermediary detection sensor. An example of such an intermediary detection sensor is a wireless network access point, e.g. WiFi, through which the display system 8 is communicatively coupled to the computer system 12. The location of the network access point is stored by the computing system 12. The physical environment or outward facing cameras 113 may also be used as location detection sensors, alone or in combination with other sensor data, e.g. GPS coordinate data. The image data may be compared with other images using pattern recognition software to identify a match.

Device data 464 may include a unique identifier for the computer system 8, a network address, e.g. an IP address, model number, configuration parameters such as devices installed, the operation system, and what applications are available in the display device system 8 and are executing in the display system 8 etc. Particularly for the see-through, mixed reality display device system 8, the device data may also include data from sensors or determined from the sensors like the orientation sensors 132, the temperature sensor 138, the microphone 110, the electrical impulse sensor 128 if present, and one or more location detection sensors 346, 144, (e.g. a GPS transceiver, an IR transceiver). Image data 469 is data captured by outward facing cameras 113 and stored to be analyzed for detecting real objects either locally or remotely by the computing system 12.

Before discussing applying image data for causing disappearance of a real object in a field of view of the see-through, mixed reality display, a discussion is first presented about components for identifying real objects in a location and a see-through display field of view. Furthermore, positions of virtual objects such as those associated with disappearances are identified and image data generated including them based on the received image data of the real world.

Computing system 12 may be implemented using one or more computer systems. In this example, the computing system 12 is communicatively coupled to one or more depth camera(s) 20A, 20B in a location for receiving three-dimensional (3D) image data of the location from which real objects and their positions in 3D can be identified.

Image data from outward (from the user's head) facing cameras 113 can be used to determine the field of view of the see-through display which approximates the field of view of the user. The cameras 113 are placed at a predetermined offset from the optical axis 142 of each display optical system 14. The offset is applied to image data of the cameras 113 for identifying real objects in the display field of view. Based on the resolution or focal length setting of the cameras 113, a distance to real objects in the field of view can be determined. In some examples, the outfacing cameras 113 may be depth cameras as well as video cameras.

As described further below, real objects are identified in image data and their appearance characteristics 475 are stored, for example in metadata 430 which are accessible over a communication network 50 from computer system 12 or stored locally $430_1$. Reference object data sets 474 provide categories of appearance characteristics tied to different types of objects, and these reference object data sets 474 may be used to recognize objects in image data, and also to select appearance characteristics of virtual objects so they look realistic. A replacement object 417 identifier may store an identifier of an instantiation of a reference object data set.

Figure 5D:
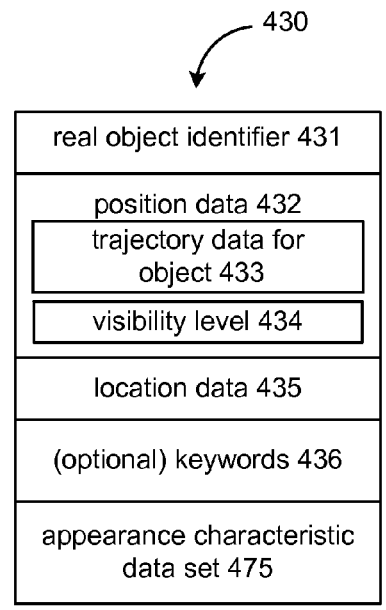
FIG. 5D illustrates an example of metadata for identifying a real object.

FIG. 5D illustrates an example of metadata for identifying a real object. A real object identifier 431 is assigned and stored for each real object detected. Additionally, position data 432 in three dimensions (3D) for the object may also be stored. In this example, the position data 432 includes trajectory data 433 for tracking at least a speed and direction of movement of an object through positions in a location. As discussed further below in FIGS. 6A through 6E, the position of the real object with respect to the field of view of the display device is identified. Additionally, the position data 432 may track a position of one or more real objects identified within a defined location even if not currently within the display device field of view. For example, the user may be in a store, home or other location where cameras in the environment like capture devices 20A and 20B track objects, including the user wearing the display device 2 in the store in a three dimensional (3D) model coordinate system of the location. Additionally, location based image data resources like Photosynth® may provide a 3D model of a location and real objects in it developed from archives of images.

The position data also includes a visibility level 434, which is based on the position of the real object from the display device system 8. The optical axes 142 of the display optical systems 14 may be reference points from which the position and trajectory of the real object is determined, and in turn the visibility level. In some embodiments, a visibility level is assigned as a refinement to a predetermined visibility distance for a location. As discussed below, location image tracking software 453 like Photosynth® may provide a predetermined visibility distance 479 for a location detected for the display device system 8 the user is wearing. For example, a display device being worn at the top of Half Dome at Yosemite may see for one hundred miles. Another display device being worn by a user walking down a busy Seattle business district street during rush hour may have a predetermined visibility distance of about 15 meters or approximately 45 feet.

A number of visibility levels may be defined based on data for the ability of average human sight to distinguish a set of appearance characteristics and movements of one or more body parts. In many embodiments, each visibility level represents at least a distance range between the object and the display device 2 and a level of recognition. In some examples, the angle of the real object from each optical axis 142 may be a basis as well as the position of the real object with respect to the display device. The trajectory may also be a basis. (As mentioned below, even if a real object is stationary, a trajectory 433 may be assigned to it because the display device system 8 is moving.) Some examples of visibility levels representing distances from farther away to closer are a color recognition level, a joint movement recognition level, and a facial movement recognition level. In some embodiments, real objects outside the predetermined visibility distance are identified with a not visible level.

Location data 435 for the real object may also be stored if available. This may be GPS data or other location data independent of the field of view of the display device 2.

Keywords 436 may be stored for the real object. In some instances, the disappearance application, local or server side, may have identified this real object as satisfying disappearance criteria. For example, the real object is stationary and in a user's work location. The keywords in such an example include the subject matter identifier. Other sources of origin for keywords may be metadata associated with the real object by other users which loaded their images to the location image databases 470 via the location image tracking application 453, e.g. Photosynth®. Furthermore, an application capturing data of a location like a store application 462 may associate keywords with real objects in its location. Additionally, keywords may be assigned for the real object based on data received by either the local or server side information push service application 459 from other applications 462 executed for the user or other users which permit them to be monitored. The disappearance application, 456 or $456_1$, may also assign keywords based on user profile data related to the real object.

An appearance characteristic data set 475 describing the physical features or characteristics of the real object from the identification processing discussed below also is stored in the real object meta data 430.

Figure 5E:
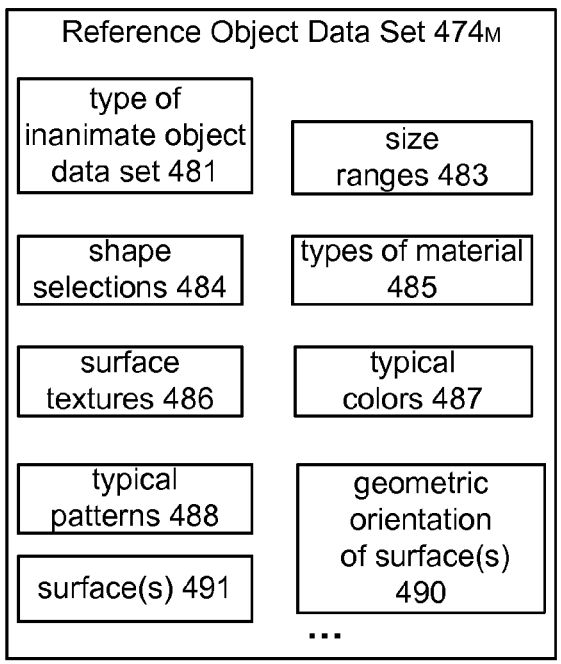
FIG. 5E illustrates an example of a reference object data set for an inanimate object which may represent data fields for a replacement object in an alteration technique.

FIG. 5E illustrates an example of a reference object data set for an inanimate object. The data fields include a type of object 481 which may be a data record which also includes sub-fields. For the type of object 481, the other data fields provide data records identifying the types of appearance characteristics typical for the type of object. For example, the other data records identify size ranges 483, shape selections 484, types of material 485, surface texture(s) 486, typical colors 487, typical patterns 488, surface(s) 491, and a geometric orientation of each surface 490. A reference object data set 474 for an object is like a template. An offline identification may have been performed manually or by pattern recognition software and is used as a basis for each reference data set 474 stored for each type of object defined for the system. In many embodiments, display data 472 for virtual objects, including virtual objects for obscuring or replacing real objects for disappearance, includes instantiations of reference object data sets. In an instantiation, at least some of the data fields of the object, e.g. size and color, are assigned a specific value.

In an example of a desk as the type of object, a sub-field of the type of object may be selected as office desk. The size ranges 483 may range from typical values of 4 to 6 feet in width, 2 to 4 feet in length and 2 to 4 feet in height. Colors available may be brown, silver, black, white, navy blue, beige, or gray. Someone may have a red office desk, so the reference appearance characteristics typically provide commonly found or average parameters. The surfaces 491 may include a flat surface which the geometric orientation 490 indicates as horizontal. Vertical surfaces may also be noted from the image data of desk. The surface texture 486 for the flat surface may be smooth and the patterns available 488 may indicate wood grain, and vinyl reflective. Types of wood grain patterns may be sub-fields or sub-records to the patterns available 488 record.

Figure 5F:
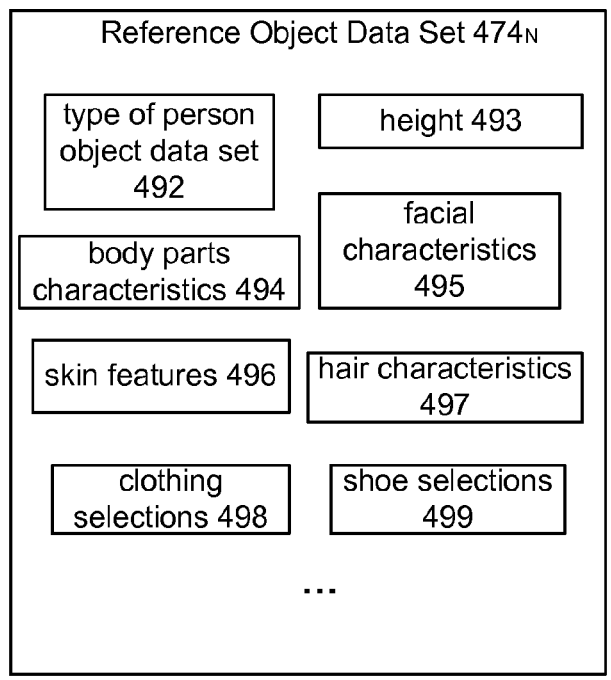
FIG. 5F illustrates an example of a reference object data set for a person which may represent data fields for a replacement object in an alteration technique.

FIG. 5F illustrates an example of a reference object data set for a person which may represent data fields for a replacement object in an alteration technique. For the type of person object data set 492, the other data fields provide data records identifying the types of appearance characteristics typical for the type of person. A type of person may be a category, some examples of which are clown, teacher, policeman, engineer, judge, and rock star. For a person, some examples of data fields and sets are illustrated including a height 493, body parts characteristics 494, facial characteristics 495, skin features 496, hair characteristics 497, clothing selections 498 and shoe selections 499. Some examples of body parts characteristics data are torso width, chest width, muscle texture, shape, leg length, position of knee with respect to overall leg, and head shape. Some examples of facial characteristics may include eye color, moles or other marks, lip shape, nose shape, forehead height. Additional features like eyebrow shape and makeup can also be stored as data in facial characteristics for a person.

As mentioned above, the reference object data sets 474 also provide input parameters for defining the appearance characteristics of a virtual object of a disappearance. In one embodiment, disappearance display data 472 may define types of virtual objects and their appearance characteristics for rendering by the microdisplay 120 of the display device 2. For example, these reference objects 474 may be considered templates and parameters for appearance characteristics of virtual objects. For display data 472, specific data values, e.g. a specific color and size, are selected in an instantiation of a template for generating the actual virtual object to be displayed. For example, a class may be defined for each type of object, and the disappearance application at runtime instantiates a virtual object of the respective class with the parameters for the appearance characteristics of size, type of material, color, pattern, surface texture, shape parameters, and geometric orientations of each surface and the object. The display data 472 may be implemented in a markup language. For example, Extensible Markup Language (XML) may be used. In another example, a markup language like Virtual Reality Modeling Language (VRML) may be used.

An appearance characteristic data set 475 for a real object may have fields and subsets defined similarly as for a reference data object set 474 of the same type but includes actual data values detected or determined based on captured data of the real object. A data value may not be able to be determined for each data field. In some embodiments, the data value assigned is chosen from a selection of available types provided by the reference object data set 474.

Sound recognition software 478 may be used to identify nearby users and other real objects in addition to interpreting commands. Facial and pattern recognition software 476 may also be used to detect and identify users in image data as well as objects in image data. User input software 477 can receive data identifying physical actions like gestures, particular spoken commands or eye movements for controlling an application. The one or more physical actions may indicate a response or request of a user with respect to a real or virtual object. For example, in FIGS. 13A through 13D, a thumb gesture indicates a real object to be made to disappear. The applications 450, 456, and 459 of the computing system 12 may also communicate requests and receive data from server side versions of sound recognition software 478 and facial and pattern recognition software 476 in identifying users and other objects in a location.

The block diagram of FIG. 4 also represents software components for recognizing physical actions in image data which is discussed further below. Furthermore, the image data plus sensor data available is processed for determining positions of objects, including other users, within a field of view of the see-through, near-eye display device 2. This embodiment illustrates how the various devices may leverage networked computers to map a three-dimensional model of a user field of view and the surrounding space and the real and virtual objects within the model. An image processing application 451 executing in a processing unit 4,5 communicatively coupled to a display device 2 can communicate image data 469 from front facing cameras 113 over one or more communication networks 50 to a depth image processing and skeletal tracking application 450 in a computing system 12 for processing of image data to determine and track objects, which include both people and things, in three dimensions. In some embodiments, additionally, the image processing application 451 may perform some processing for mapping and locating objects in a 3D user space locally and may interact with the remote location image tracking application 453 for receiving distances between objects. Many combinations of shared processing are possible between the applications by leveraging network connectivity.

A depth image processing and skeletal tracking application 450 detects objects, identifies objects and their locations in the model. The application 450 may perform its processing based on depth image data from depth cameras like 20A and 20B, two-dimensional or depth image data from one or more outward facing cameras 113, and images obtained from databases 470. The image databases 470 may include reference images of objects for use in pattern and facial recognition (e.g. as may be performed by software 476). Some of the images in one or more of the databases 470 may also be accessed via location metadata 435 associated with objects in the images by a location image tracking application 453. Some examples of location metadata include GPS metadata, location data for network access points like a WiFi hotspot, location data based on cell tower triangulation, and location data from other types of wireless transceivers.

The location image tracking application 453 identifies images of the user's location in one or more image database (s) 470 based on location identifier data received from the processing unit 4,5 or other location units (e.g. GPS units) identified as being within a vicinity of the user, or both. Additionally, the image database(s) 470 may provide images of a location uploaded by users who wish to share their images. The database may be indexed or accessible with location metadata like GPS data, WiFi SSID, cell tower based triangulation data, a WUSB port location, or a position of an infrared transceiver. The location image tracking application 453 provides distances between objects in an image based on location data to the depth image processing application 450. In some examples, the location image tracking application 453 provides a three-dimensional model of a location, and the model may be dynamic based on real-time image data updates provided by cameras in the location. Besides fixed cameras in specified locations, other users's display device systems 8 and mobile devices can provide such updates. Photosynth® is an example of such a location image tracking application 453.

The depth image processing and skeletal tracking application 450, and the image processing software 451, may both generate metadata 430 for real objects identified in image data. For identifying and tracking living things, at least humans anyway, in a field of view or user location, skeletal tracking may be performed.

Outward facing cameras 113 provide RGB images (or visual images in other formats or color spaces) and depth images in some examples to computing system 12. If present, capture devices 20A and 20B may also send visual images and depth data to computing system 12 which uses the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 application), incorporated herein by reference in its entirety.

The process of the '437 application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. patent applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Skeletal tracking data identifying which joints moved over a period of time and is sent to a gesture recognizer engine 454 which includes multiple filters 455 to determine whether a gesture or action was performed by any person or object in the image data. A gesture is a physical action for a user to provide input to the disappearance application. A filter comprises information defining a gesture, action or condition along with parameters, or metadata, for that gesture, or action. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine 454 that the gesture occurred. These parameters for the gesture may vary between applications, between contexts of a single application, or within one context of one application over time.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made. In some instances, two-dimensional image data is only available. For example, the front facing cameras 113 only provide two-dimensional image data. From the device data 464, the type of front facing camera 113 can be identified, and the recognizer engine 454 can plug in two-dimensional filters for its gestures.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

The image processing software 451 executing in the display device system 8 may also have depth image processing capability or a capability for 3D position estimation of an object from stereo images from the outward facing cameras 113. Additionally, the image processing software 451 may also include logic for detecting a set of gestures indicating user input. For example, a set of finger or hand gestures may be recognizable. Skeletal tracking may be used but pattern recognition of the finger or hand in image data may also recognize a gesture in the set.

In the discussion below of identifying objects around a user, references to outward facing image data are referring to image data from outward facing cameras 113. In these embodiments, the field of view of the outward facing cameras 113 approximates the user field of view as the camera is located at a relatively small offset from the optical axis 142 of each display optical system 14, and the offset is taken into account in processing the image data.

FIG. 6A is a flowchart of an embodiment of a method for determining positions of real and virtual objects in a three-dimensional field of view of the display device system. In step 510, one or more processors of the control circuitry 136, the processing unit 4,5, the computing system 12 or a combination of these receive image data from one or more outward facing cameras, and in step 512 identify one or more real objects in the outward facing image data. In some embodiments, outward facing image data is three-dimensional image data. Data from the orientation sensor 132, e.g. the three axis accelerometer 132C and the three axis magnetometer 132A, can also be used with the outward facing camera 113 image data for mapping what is around the user, the position of the user's face and head in order to determine which objects, real or virtual, he or she is likely focusing on at the time. The facial and pattern recognition software 476 may identify objects of people and things by comparison with reference object data sets 474 and actual images stored in image databases 470.

In step 514, the one or more processors executing the facial and pattern recognition software 476 also identify one or more appearance characteristics of each real object such as type of object, size, surfaces, geometric orientation, shape, color, etc. In step 516, a three-dimensional (3D) position is determined for each real object in the field of view of the see-through display device. Based on an executing application, the one or more processors in step 518 identify one or more virtual object 3D positions in the field of view. In other words, where each object is located with respect to the display device 2, for example with respect to the optical axis 142 of each display optical system 14.

FIG. 6B is a flowchart of an embodiment of a method for identifying one or more real objects in a field of view of the display device. This embodiment may be used to implement step 512. In step 520, a location of user wearing the display device 2 is identified. For example, GPS data via a GPS unit 965 (see FIG. 17) in the mobile device 5 or GPS transceiver 144 on the display device 2 may identify the location of the user. Additionally, an IP address of a WiFi access point or a cellular station to which the display device system 8 has a connection can identify a location. Cameras at known positions within a location may identify the user through facial recognition. Additionally, identifier tokens may be exchanged between display device systems 8 via infrared, Bluetooth, RFID transmission, or WUSB. The range of the infrared, RFID, WUSB or Bluetooth signal can act as predefined distance for determining proximity to a reference point, like the display device of another user.

In step 522, one or more processors, retrieve one or more images of the location from a database (e.g. 470), for example via a request to the image tracking software 453. Local or server based executing versions or both of the facial and pattern recognition software 476 in step 524 select one or more images matching image data from the one or more outward facing cameras 113. In some embodiments, steps 522 and 524 may be performed remotely by a more powerful computer, e.g. 12, having access to image databases. Based on location data (e.g. GPS data) in step 526, the one or more processors determine a relative position of one or more objects in outward facing image data to one or more identified objects in the location, and in step 528, determines a position of a user from the one or more identified real objects based on the one or more relative positions.

In some embodiments, such as in FIG. 1A with depth cameras 20A and 20B capturing depth image data for the living room, a user wearing a see-through, near-eye, mixed reality display may be in a location in which depth image processing software 450 of a computer system 12 provides a three-dimensional mapping of objects within a location such as a defined space, e.g. a store. FIG. 6C is a flowchart of an embodiment of a method for generating a three-dimensional model of a location. In step 530, a computer system with access to depth cameras like system 12 with capture devices 20A and 20B creates a three-dimensional model of a location based on depth images. The depth images may be from multiple perspectives and may be combined based on a common coordinate location, e.g. a store space, and creates a volumetric or three dimensional description of the location. In step 532, objects are detected in the location. For example, edge detection may be performed on the depth images to distinguish objects, including people, from each other. In step 534, the computer system 12 executing depth image processing and skeletal tracking software 450 and the facial and pattern recognition software 476 identifies one or more detected objects including their positions in the location, and identifies in step 536 one or more appearance characteristics of each real object. The objects may be identified with reference images of things and people from user profile data 460, image databases 470, and the reference object data sets 474.

The image processing software 451 can forward outward facing image data and sensor data to the depth image processing software 450 and receives back from the computer system 12 three-dimensional positions and identifications including appearance characteristics. The three-dimensional positions may be with respect to a 3D model coordinate system for the user location. In this way, the disappearance application $456_1$ can determine which real objects are in the field of view and which real objects are not currently in the field of view, but which are in the 3D modeled location.

Figure 6D:
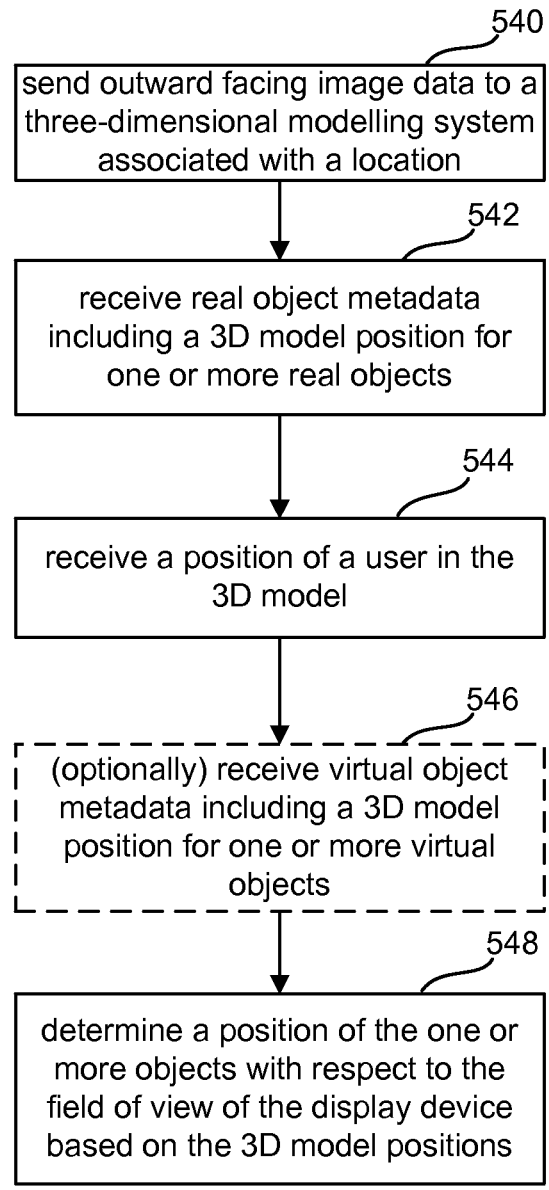
FIG. 6D is a flowchart of an embodiment of a method for determining positions of real and virtual objects in a three-dimensional field of view of the display device system based on a three-dimensional model of a location.

FIG. 6D is a flowchart of an embodiment of a method for determining positions of real and virtual objects in a three-dimensional field of view of the display device system based on a three-dimensional model of a location. In step 540, one or more processors (210, 320, 322) of the display device system 8 send outward facing image data to a three-dimensional modeling computer system associated with a location. For example, the image processing software 451 sends the outward facing image data to the depth image processing and skeletal tracking software 450 of computer system 12. The image processing software 451 receives in step 542 real object metadata including a 3D model position for one or more real objects in the location. The real objects are detected from image data from cameras in the environment which can include the outward facing cameras of other users as well. In step 544, the image processing software 451 receives a position of a user in the 3D model. Optionally, in step 546, the image processing software 451 receives virtual object metadata including a 3D model position for one or more virtual objects in the location. The image processing software in step 548 determines a position of the one or more objects with respect to the field of view of the display device based on the 3D model positions. Each of the embodiments of FIGS. 6A through 6D are typically performed repeatedly as the user and objects within the user's environment move around.

For a real object indicated for disappearance by the disappearance application 456, $456_1$ in the user's see-through display, the image processing application 451 tracks the position of the real object in the field of view of the display device to a position in each display optical system, and tracks indicated display data 472, $472_1$, e.g. a black rectangle for redaction, to cover the real object in each display optical system 14, and thus in the field of view. The image processing application 451 of the see-through, mixed reality display device system 8 will format display data 472, $472_1$ for causing disappearance of a real object under control of the device side disappearance application $456_1$ to a format which can be processed by the image generation unit 120, e.g. the microdisplay 120, and provide instructions to the opacity controller 224 for the opacity filter 114, if used. For some alteration techniques like erasure, disappearance display data 472, $472_1$ comprises image data generated by copying image data surrounding the real object to be erased and covering the erased object with it. In other examples, the disappearance display data 472, $472_1$ is image data (e.g. from a database 470) of what is behind the object to be erased.

FIGS. 7 through 12 present embodiments of methods for the technology and example implementation processes for some of the steps of the methods. For illustrative purposes, the method embodiments below are described in the context of the system embodiments described above. However, the method embodiments are not limited to operating in the system embodiments described above and may be implemented in other system embodiments. As mentioned above for FIGS. 6A through 6D, these embodiments of methods and processes are repeatedly performed also as the user wearing a see-through display moves at least his or her eyes and objects in the field of view may move under their own control.

Figure 7:
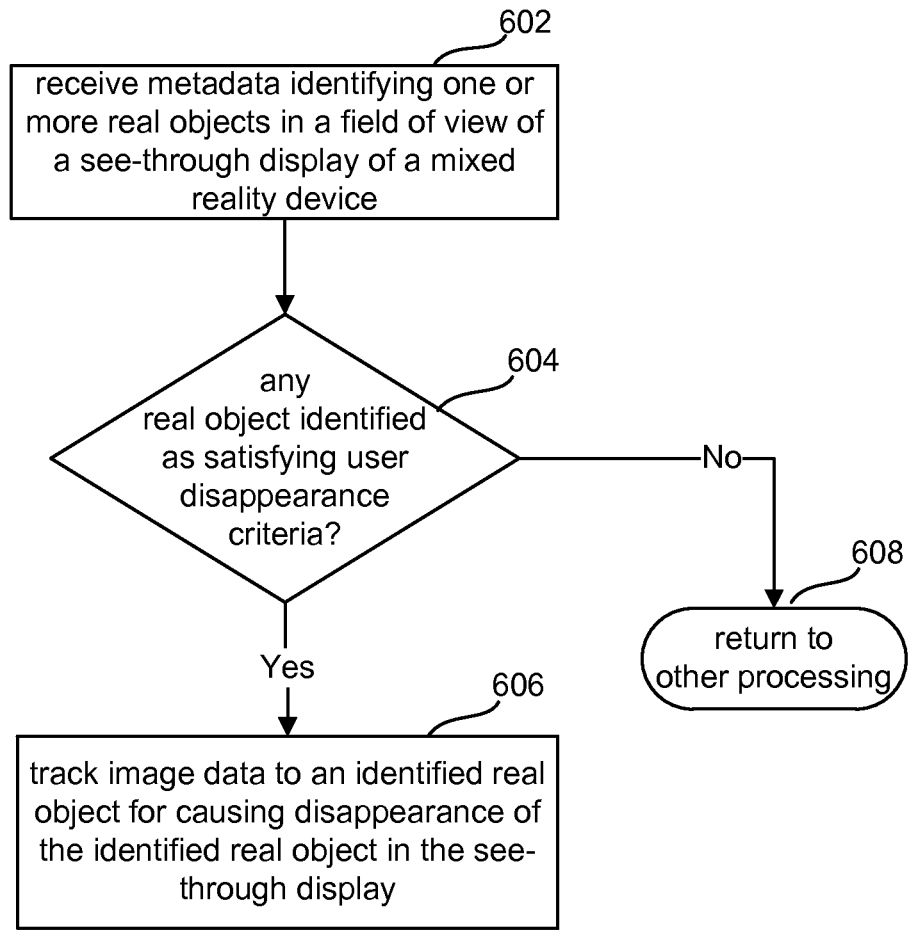
FIG. 7 is a flowchart of an embodiment of a method for causing disappearance of a real object in a field of view of a see-through, mixed reality display device system based on satisfying user disappearance criteria.

FIG. 7 is a flowchart of an embodiment of a method for causing disappearance of a real object in a field of view of a see-through, mixed reality display device system based on satisfying disappearance criteria. In step 602, the image processing software 451 receives metadata identifying one or more real objects in at least a field of view of a see-through display of a mixed reality device which the software 451 may store, at least temporarily, in a memory also accessible by the disappearance application $456_1$. Based on the metadata, in step 604, the disappearance application $456_1$ identifies any real object which satisfies user disappearance criteria.

In some examples, the local device disappearance application $456_1$ receives a message from the server side application 456 identifying which real objects satisfy user disappearance criteria. In yet other applications, the local disappearance application $456_1$ performs keyword searches on the real object meta data received and locally identifies real objects for disappearance.

For any real object identified for disappearance, the disappearance application $456_1$ causes the image processing software 451 to control the images on the see-through display via the image generation unit 120 for tracking image data to any identified real object for causing its disappearance in the see-through display. If no real object in the field of view is identified for disappearance, the one or more processors of the display device system 8 return to other processing in step 608.

Figure 8:
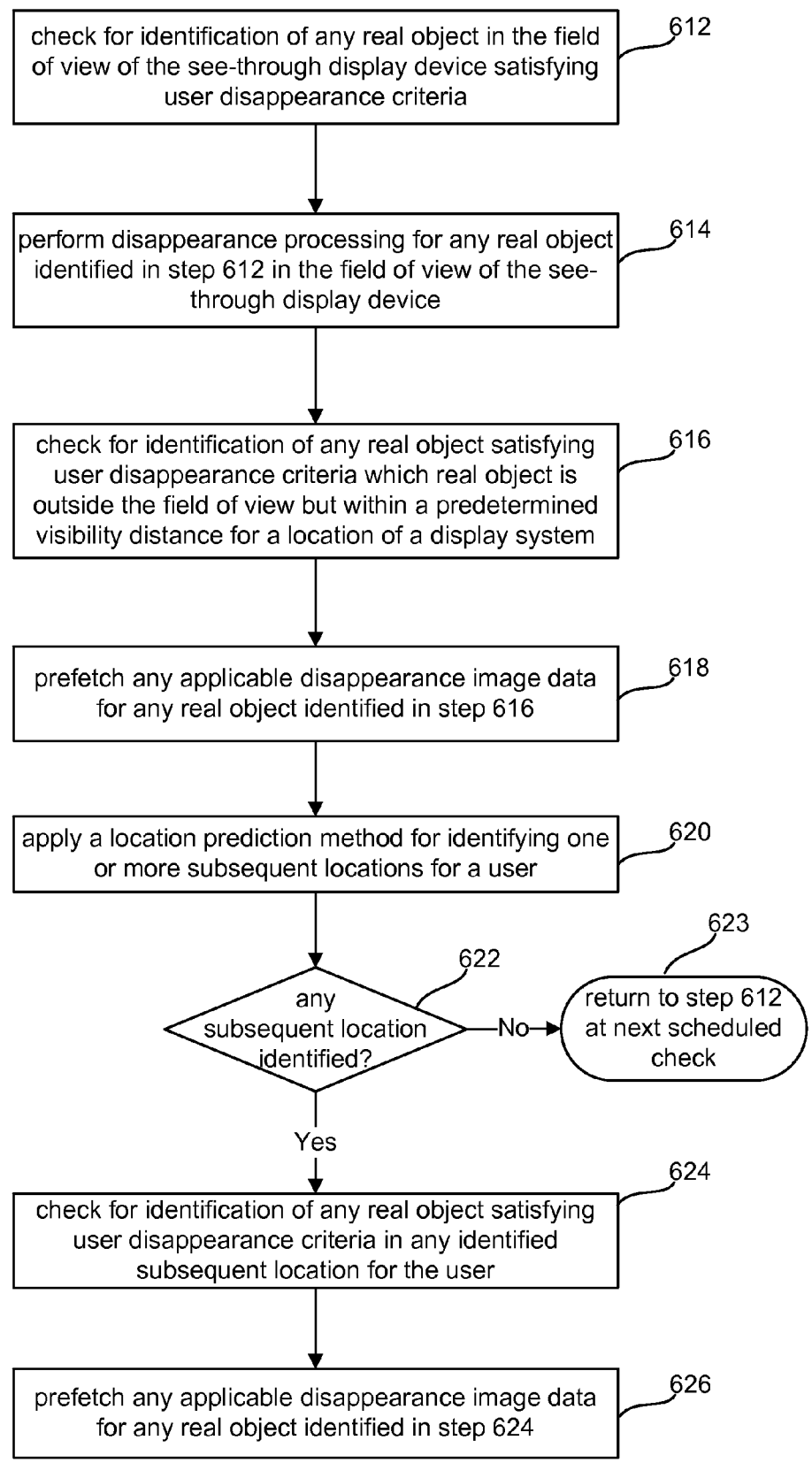
FIG. 8 is a flowchart of an embodiment of another method for causing disappearance of a real object in a field of view of a see-through, mixed reality display device system.

FIG. 8 is a flowchart of an embodiment of another method embodiment for causing disappearance of a real object in a field of view of a see-through, mixed reality display device system. The embodiment of FIG. 8 may be used to implement steps 604, 606 and 608 of the embodiment of FIG. 7. In step 612, the disappearance application $456_1$ checks for identification of any real object in the field of view of the see-through display device satisfying user disappearance criteria. In step 614, disappearance processing, e.g. step 606 of FIG. 7, is performed for any real object identified in step 612 in the field of view of the see-through display device.

Network access to software and image databases which track locations and the real objects therein allow the disappearance application $456_1$ to prefetch any applicable image data for real objects designated for disappearance in such tracked locations, when user entry into such a location satisfies prediction criteria.

In step 616, the disappearance application $456_1$ checks for identification of any real object satisfying user disappearance criteria, but which is outside the current field of view of the display device but within a predetermined visibility distance for the location of the display device system 8 of the user. In step 618, the disappearance application $456_1$ prefetches or causes to be prefetched any applicable disappearance image data for any real object identified in step 616.

In step 620, the disappearance application $456_1$ applies or causes to be applied a location prediction method for identifying one or more subsequent locations which satisfy a prediction criteria. In step 622, the disappearance application $456_1$ determines whether any satisfactory subsequent location has been identified. If not, then in step 623, processing returns to the field of view checking in step 612 at a next scheduled check. If a subsequent location satisfying prediction criteria was identified in step 622, the disappearance application $456_1$ checks for identification of any real object satisfying user disappearance criteria in any identified subsequent location in step 624, and prefetches, in step 626, any applicable disappearance image data for any real object identified in step 624.

As the field of view of the display device includes on what the user's eye are currently focused as well as what the user can peripherally see at the current point of time, the hardware and software components of the display system prioritize keeping the field of view free of real objects satisfying user disappearance criteria, over prefetching of data and location prediction. Thus, in some embodiments, the check (step 612) for identifying any real objects for disappearance in the field of view and disappearance processing, if any found (step 614), may occur more often and have higher priority for components of the display system 8 than the prefetching and location prediction steps.

As discussed for FIG. 7, the server side disappearance application 456 may send a message which the local application $456_1$ checks for identifying real objects satisfying user disappearance criteria in the field of view, within a predetermined visibility distance for a location of the user, or in a subsequent location. In other words, networked resources are leveraged for assistance in identifying real objects for disappearance. The implementation example process of searching metadata for matches to subject matter keywords and identifiers for identifying real objects for disappearance may be performed by the server side application 456 to offload work from the local device system processors. The local copy $456_1$ may also prefetch by requesting the server side disappearance application 456 to perform the prefetching, and apply a location prediction method by requesting the server side 456 to have the location prediction performed and provide the results of any identified subsequent locations.

Additionally, the server side application 456 may assist with disappearance processing by providing the disappearance image display data 472 for a particular alteration technique when requested by the local application $456_1$ to save memory space on the display system 8.

Furthermore, the application copy requesting the prefetching, for example either the local disappearance application $456_1$ or the server side 456, may prefetch the image data to be stored at another participating computer system in the location of the real object to be made to disappear. In the case of a subsequent location, the requesting application can schedule the other computer system to download the image data at a certain time period before the estimated arrival of the user. The image data for alteration arrives in time for the user's entry into the location. In one example, the local copy application $456_1$ may then download the image data to the display device system 8 when a connection is made with the other computer system 8, or in another example, when the user's display device system 8 is within a distance criteria of a reference point in the location.

As mentioned above, for each location, the location based tracking application 453 may have assigned a predetermined visibility distance. For a real object for disappearance, a user or application may have selected an alteration technique such as replacing the undesired real object with an avatar overlay which tracks the facial expressions or at least the body movements of the real object, a person in this example. The person to be overlaid with the avatar may be within the predetermined visibility distance, but is more than forty feet away so the user cannot clearly see the facial expressions of the person.

As tracking the facial expressions of a real person with avatar facial expressions is computationally intensive and of little benefit to the user at this distance, another alteration technique or different image data may be applied. For example, image data of the person, or the avatar, with a blurred appearance may be displayed to the user. When the person is within, for example twenty feet, of the user, then the local copy of the disappearance application $456_1$ or the server copy 456 works with the image processing software 451, the depth image processing and skeletal tracking application 450 or both to track the movements of the person, and continuously tracks the person's position in the field of view to a position on the display optical systems 14 so the image generation unit 120 tracks image data of the avatar's movements to those of the disappeared person's body. When the person is within ten (10) feet of the user, both facial and body movement tracking of the avatar image data to the person in the see-through display is performed. This example illustrates selection of different alteration techniques for different visibility levels.

Visibility level definitions may be programmed as part of the disappearance application 456, $456_1$ or stored in accessible memory. Visibility levels may be based on studies of which appearance characteristics and movements are visually recognizable for an average person. Other refinements in visibility levels based on personal characteristics, for example age, may also be incorporated.

Figures 9, 10:
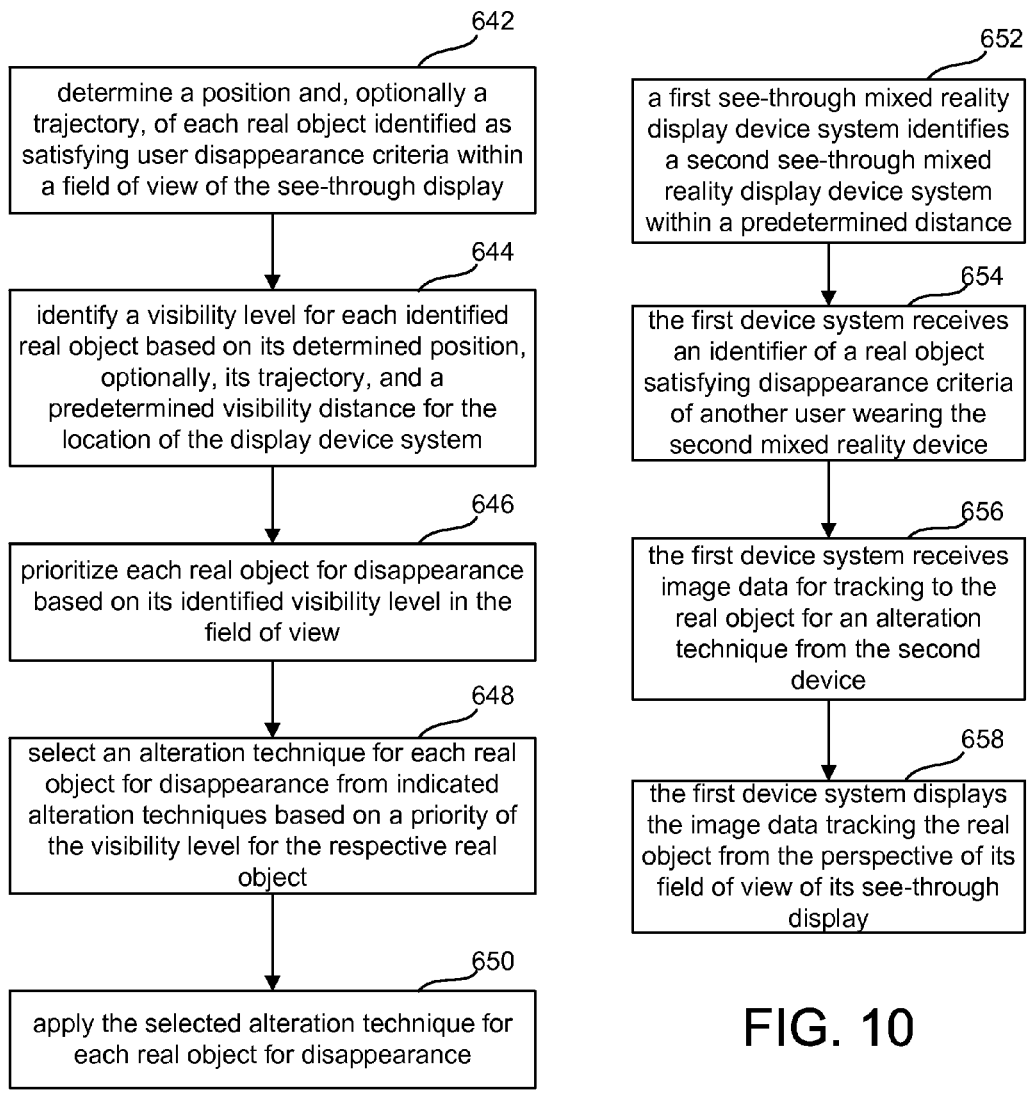
FIG. 9 is a flowchart of an embodiment of a process for selection of an alteration technique based on a visibility level of a real object for disappearance.
FIG. 10 is a flowchart of an embodiment of a process for sharing alteration image data between see-through, mixed reality display device systems within a predetermined distance of each other.

FIG. 9 is a flowchart of an embodiment of a process for selection of an alteration technique based on a visibility level of a real object for disappearance. The embodiment of FIG. 9 is an example of a process which may be used in implementing step 606 or step 614. In step 642, the disappearance application 642 determines a position, and optionally a trajectory, of each real object identified as satisfying user disappearance criteria within a field of view of the see-through display. A trajectory for a stationary object may be determined, even though it is not moving, based on the user's movement with respect to the stationary real object. Based on the determined position, and optionally the trajectory, of each identified real object, and the predetermined visibility distance for the user's display device location, the disappearance application $45_{61}$ identifies a visibility level in step 644.

Appearance characteristics may also be a basis for selecting a visibility level. Some examples of appearance characteristics which may be a basis for determining a visibility level are size and color. A person wearing bright orange at forty feet may have a visibility level indicating more likely to be seen in the user field of view than a person wearing a navy blouse that is 25 feet away.

In step 646, each real object is prioritized for disappearance based on its identified visibility level in the field of view. Priority increases for a visibility level with closeness to the display device in the field of view. In step 648, an alteration technique is selected for each real object for disappearance based on a priority of the visibility level for the respective real object. Other bases for selection of an alteration technique may include computation time to implement the alteration technique, memory resources available and the number of real objects to be made to disappear from the current field of view. For example, is a child wearing a see-through mixed reality display device is scared of clowns, and a parade for the local circus is going down the street. Replacing each of five clowns which just came into the field of view of the see-through display with the desired bunny rabbit avatar may not occur quickly enough without exposing the child to at least one clown. A redaction effect may be applied at first, for example a black box displayed over each clown. In step 650, the selected alteration technique is applied for each real object satisfying disappearance criteria. In the next iteration of the process of FIG. 9, the black box of one or more of the redacted clowns may be replaced with the bunny rabbit avatar overlay.

The prioritizations in the example of FIG. 9 may also be applied to selection of different replacement objects for the disappearance image data for a selected technique. As discussed above, the user may have selected an alteration technique of replacement and has indicated he or she will accept replacement objects generated by other users. Some of the image data associated with these replacement objects may require a lot of memory and have dynamic content so they are more computationally expensive to display. The disappearance application $456_1$ may select from among the available replacement objects based also on the factors of visibility level, implementation time and number of objects to process.

A user may share his alteration image data with another nearby user so the nearby user can experience how the user experiences the real world around them. FIG. 10 is a flowchart of an embodiment of a process for sharing alteration image data between see-through, mixed reality display device systems within a predetermined distance of each other. In step 652 a first see-through mixed reality display device system identifies a second see-through mixed reality display device system within a predetermined distance. For example, the display device systems may exchange identity tokens via a Bluetooth, WUSB, IR or RFID connection. The type and range of wireless transceiver can be selected to allow connections oly within a predetermined distance. Location data such as GPS or cell triangulation in combination with an application like Bump® may also be used for identifying devices within a predetermined distance of each other.

In step 654, the disappearance application $456_1$ of the first device receives an identifier of a real object satisfying disappearance criteria of another user wearing the second mixed reality device, and in step 656, the first device receives image data from the second device for tracking to the real object for an alteration technique. In step 658, the disappearance application $456_1$ of the first device displays the image data tracking the real object from the perspective of its field of view of its see-through display.

FIG. 11 is a flowchart of an embodiment of another method for causing disappearance of a real object in a field of view of a see-through, mixed reality display device system based on a current subject matter of interest. In step 662, the disappearance application $456_1$ receives a current subject matter of interest for a user. As mentioned above, a user may identify a current subject of interest with a physical action like gaze duration, blink commands, other eye movement based commands, audio data, and one or more gestures. A user may also indicate a current subject of interest through text entry, for example via the mobile device 5 embodiment of the processing unit 4. Besides direct user entry, other executing applications can leverage the disappearance capability to enhance their services to the user. In other examples, another executing application 462 determines the current subject matter of interest for the user based on its data exchanges with the user and sends the current subject matter of interest to user, for example as part of a current subject matter of interest data item 420.

In step 664, the disappearance application $456_1$ identifies any real object types associated with the current subject matter of interest. When interfacing with an executing application 462, the application 462 indicates real object types(s) for the current interest, e.g. via a data item like 420, to the disappearance application $456_1$. In the case of a user, the disappearance application $456_1$ may output an audio or visual request for the user to identify real object types of which the user only wishes to see ones relevant to the current interest. The user may enter input identifying such real object types using any of the various input methods discussed above. The disappearance application $456_1$ may also identify real object types based on searches related to the subject matter in online databases and user profile data. Additionally, default real object types may have been stored for common subjects of interests, some examples of which are restaurants and directions.

In step 666, the disappearance application $456_1$ identifies any real objects in the field of view of the see-through display matching any identified real object type, for example based on matches with an object type in appearance characteristics stored in the metadata for each real object identified as being in the current field of view by the image processing software 451. In step 668, the disappearance application $456_1$ determines whether any identified real object does not satisfy relevance criteria for the current subject matter of interest. For example, the disappearance application $456_1$ can apply a keyword search technique to the metadata of any real object identified as having a matching real object type. The search technique returns a relevancy score for each real object. For example, the applied keyword search technique may return a relevancy score based on a Manhattan distance weighted sum for the metadata of the real object. Based on a keyword relevancy score for each real object metadata search, in step 668, the disappearance application $456_1$ identifies any real object not satisfying relevance criteria for the current subject matter of interest. In step 670, the disappearance application $456_1$ causes the image generation unit 120 for example via the image processing software 452, to track image data to each real object not satisfying relevance criteria for causing its disappearance in the field of view of the see-through display. In the example of the woman looking for the Chinese restaurant in a crowded restaurant district street, removing other building signs declutters her view so she may more quickly find the Chinese restaurant where her friends are waiting.

Of course, although a real object may be made to disappear from the field of view of the see-through display, the real object is still there in the user's environment. To avoid the user walking into people or other objects and being injured, a collision avoidance mechanism may be employed. FIG. 12 is a flowchart of an embodiment of a process for providing a collision warning to a user with respect to a disappeared real object. In step 682, the disappearance application 456, 456$_1$ determines a position and a trajectory of the mixed reality display device relative to a real object which is disappeared from the see-through display. In step 684, the disappearance application 456, 456$_1$ determines whether the mixed reality device and the real object are within a collision distance. If the device and the disappeared real object are within a collision distance, then in step 686, the disappearance application 456, 456$_1$ outputs a safety warning. For example, the disappearance application 456, 456$_1$ displays image data or plays audio data including a safety warning. If the device and the real object are not within a collision distance, processing in step 688 returns to other tasks such as a task for another application or updating the identification of real objects in the field of view until a next scheduled check.

Figure 13A:
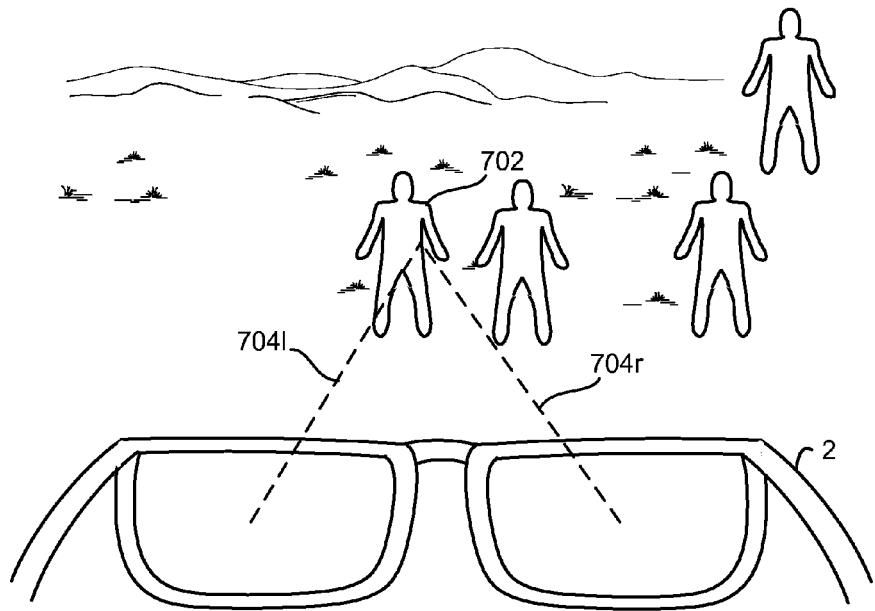
FIGS. 13A, 13B, 13C and 13D illustrate an example of processing gesture user input which identifies a real object for disappearance.

FIGS. 13A, 13B, 13C and 13D illustrate an example of processing gesture user input which identifies a real object for disappearance. FIG. 13A illustrates a view from the perspective of a user wearing display device 2. He is currently focused as indicated by the dashed lines 704*l* and 704*r* on the space in front of him occupied by a person 702. In this example, the user wearing the display device 2 wants to see an unobstructed view of the wildflowers and mountains, but the park is crowded, and a person 702 always seems to be in his way.

Figure 13B:
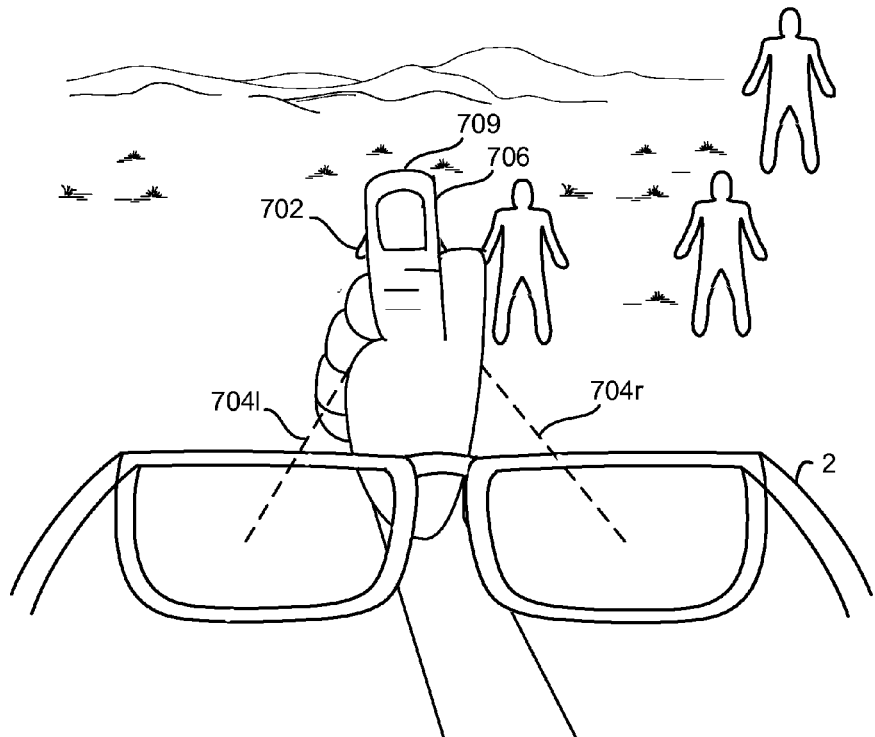
Figure 13C:
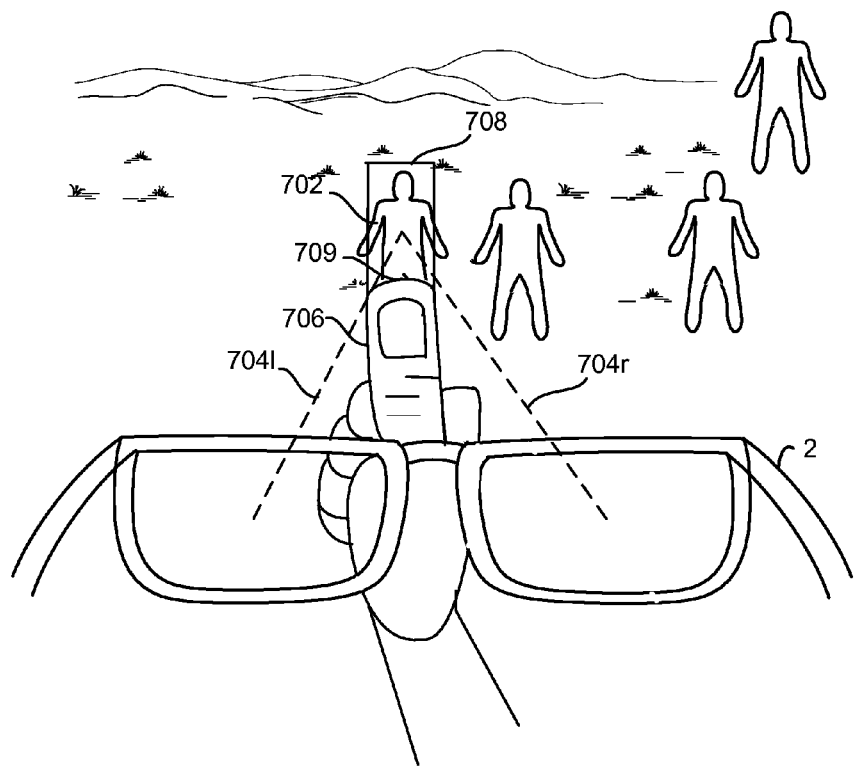

FIG. 13B illustrates a first position of a thumb gesture which is an example of a gesture for indicating disappearance. The thumb 706 is positioned in front of the display device and blocking person 702. The image processing software 451 sends a notification to the user input software 477 that a first position of a thumb gesture has been detected in image data from the outward facing cameras 113. In this example, the disappearance application 456$_1$ activates an outline tool application and inputs the thumb tip position 709 as the starting reference point for the outline. The outline follows the width of the thumb in this example. FIG. 13C illustrates an example of an outline following the movement on the display of the thumb performing the gesture. The image processing software 451 displays the outline to match the thumb movement and identifies the real objects positioned within the outline. User input indicating deactivation of the outline tool is received. For example, the thumb stops for a predetermined time period or is no longer detected within the field of view of the outward facing cameras 113. The image processing software 451 notifies the disappearance application 456$_1$ of the real object identifier of any object within the outline. In this example, the user input software 477 has received an "erase" command from the sound recognition software 478 which processed audio data from the microphone 110. In another example, eye movements or text entry could have been used to select an erasure alteration technique. Additionally, a default alteration technique could be selected.

Figure 13D:
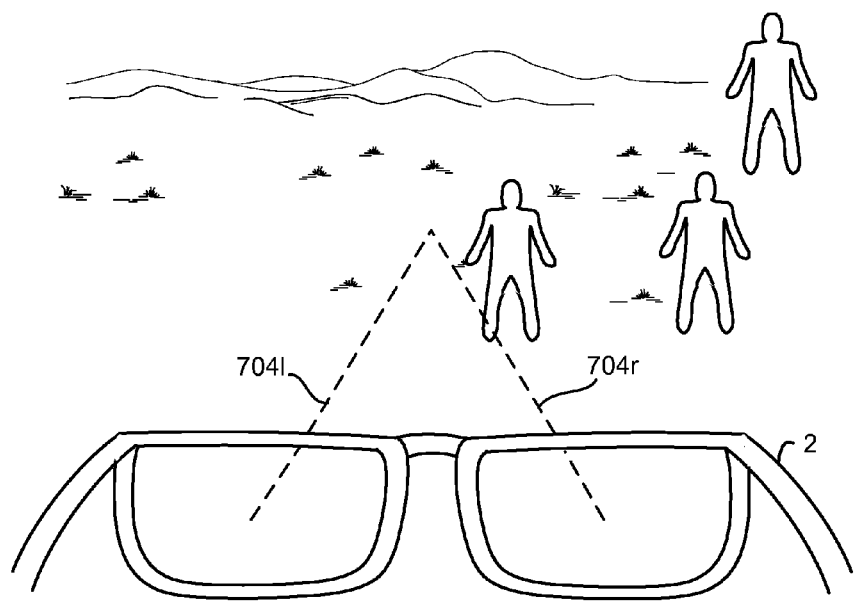

Based on the thumb gesture and the audio erase command, the disappearance application 456$_1$ sends location data and image data from the cameras 113 to the location image tracking application 453 over a network with a request for real-time image data at the location and from the perspective of the see-through display as represented by the image data from cameras 113 and their predetermined offset from the display optical axes 142. If the real time image data is available, for example from a display device system 8 being worn by person 702, the disappearance application 456$_1$ causes the image processing software 451 to display the image data over the person 702 for the perspective of the user. FIG. 13D illustrates an example of the see-through display field of view with the obstruction of the person 702 removed. The edges of the image data may need to be blended with image data of the surrounding space around the person 702 extracted from the image data from the outward facing cameras 113. In another example, image data of the surrounding space may be extracted and replicated to generate image data obscuring an object.

Figure 14A:
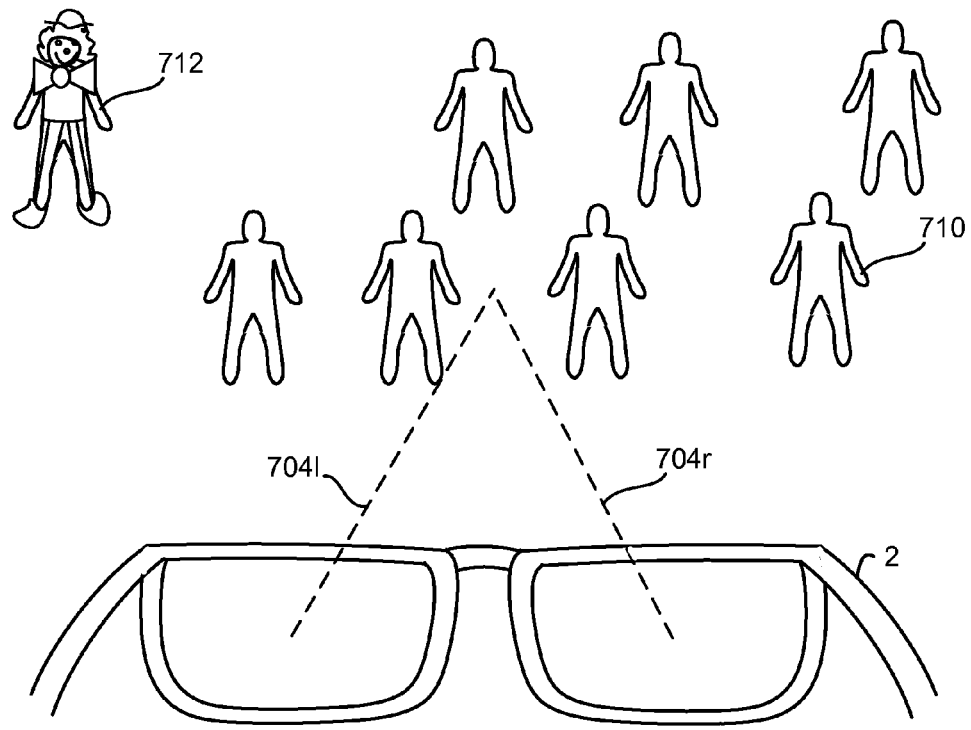
FIGS. 14A, 14B, 14C and 14D illustrate examples of different alteration techniques applied to a real object satisfying user disappearance criteria based on different visibility levels.

FIGS. 14A, 14B, 14C and 14D illustrate examples of different alteration techniques applied to a real object satisfying user disappearance criteria based on different visibility levels to the display device. In this example, a user has identified a clown as a type of real object to be made to disappear when the user is wearing her see-through display device 2. FIG. 14A illustrates an example of a real object satisfying user disappearance criteria, a clown 712 in this example, in a field of view of a see-through display device within a predetermined visibility distance for a user location. The clown 712 is just one of other objects, mostly people like person 710 in the field of view of the display device. Here, the user's point of gaze as indicated by dashed lines 704*l* and 704*r* is straight ahead in front of the user.

Figure 14B:
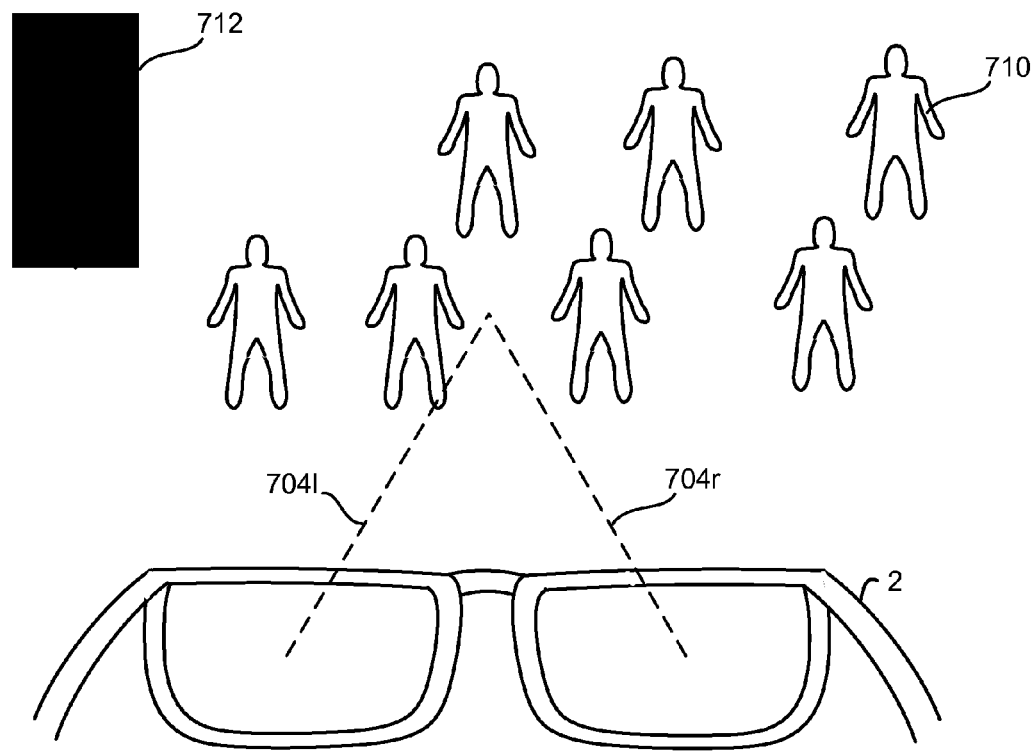

The user has also selected a replacement object of an avatar which looks like an ordinary person for the location to be overlaid and tracked to any clowns. The disappearance application 456$_1$ may select from a number of replacement objects representing ordinary people for the location. Although the clown is within the predetermined visibility distance 479 for the location, the distance to the clown indicates a visibility level for color detection only in the current location, a busy business district street. The disappearance application 456$_1$ causes redaction effect black image data to be applied while the clown is in this visibility level. Avatar data may be prefetched while the trajectory of the clown with respect to the display device is monitored by the disappearance application 456$_1$. FIG. 14B illustrates an example of a redaction alteration technique being applied to the clown. Black image data is tracked to the clown in the see-through display of the device 2.

Figure 14C:
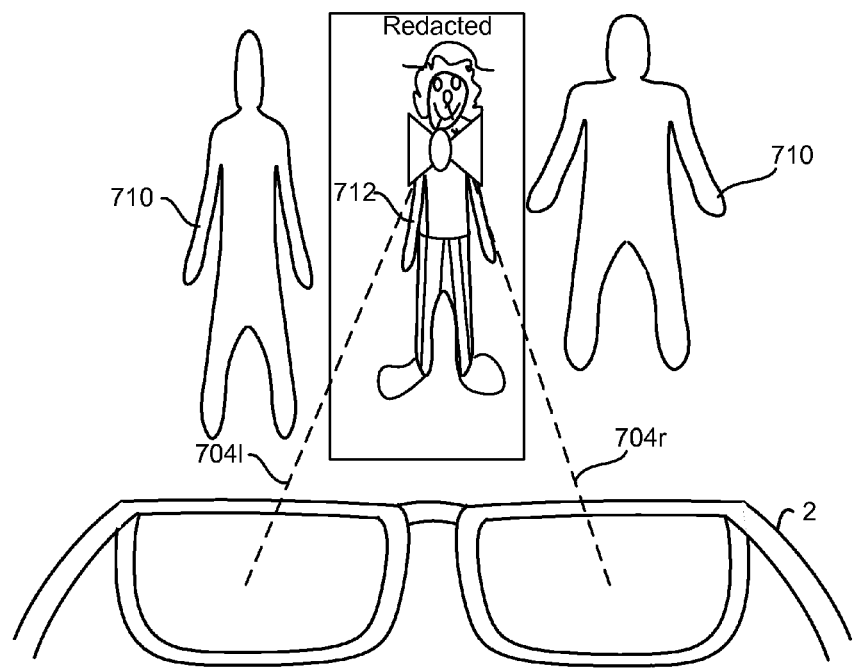
Figure 14D:
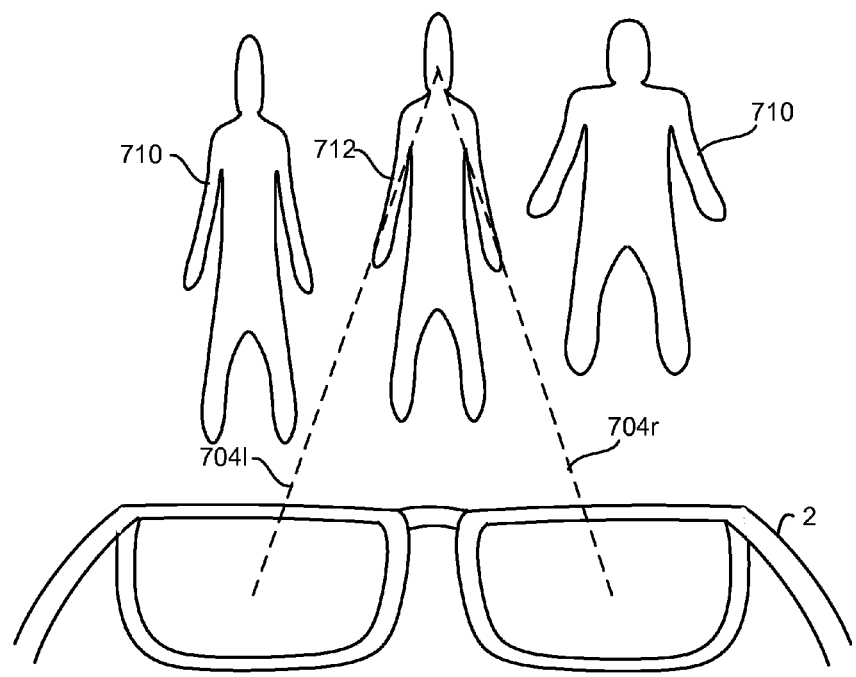

FIG. 14C illustrates an example of the clown being in a visibility level in which movements of joints of a person object are visible based on vision capability for an average person of the user's age. FIG. 14D illustrates an example of image data for an avatar replacing the clown in the field of view of the see-through display device. The avatar movements mimic the movements of the clown. In some examples, tracking facial movements of the clown may be performed under control of the disappearance application 456$_1$. A visibility level for facial movement detection may also be stored or defined in the disappearance application 456$_1$.

Figure 15A:
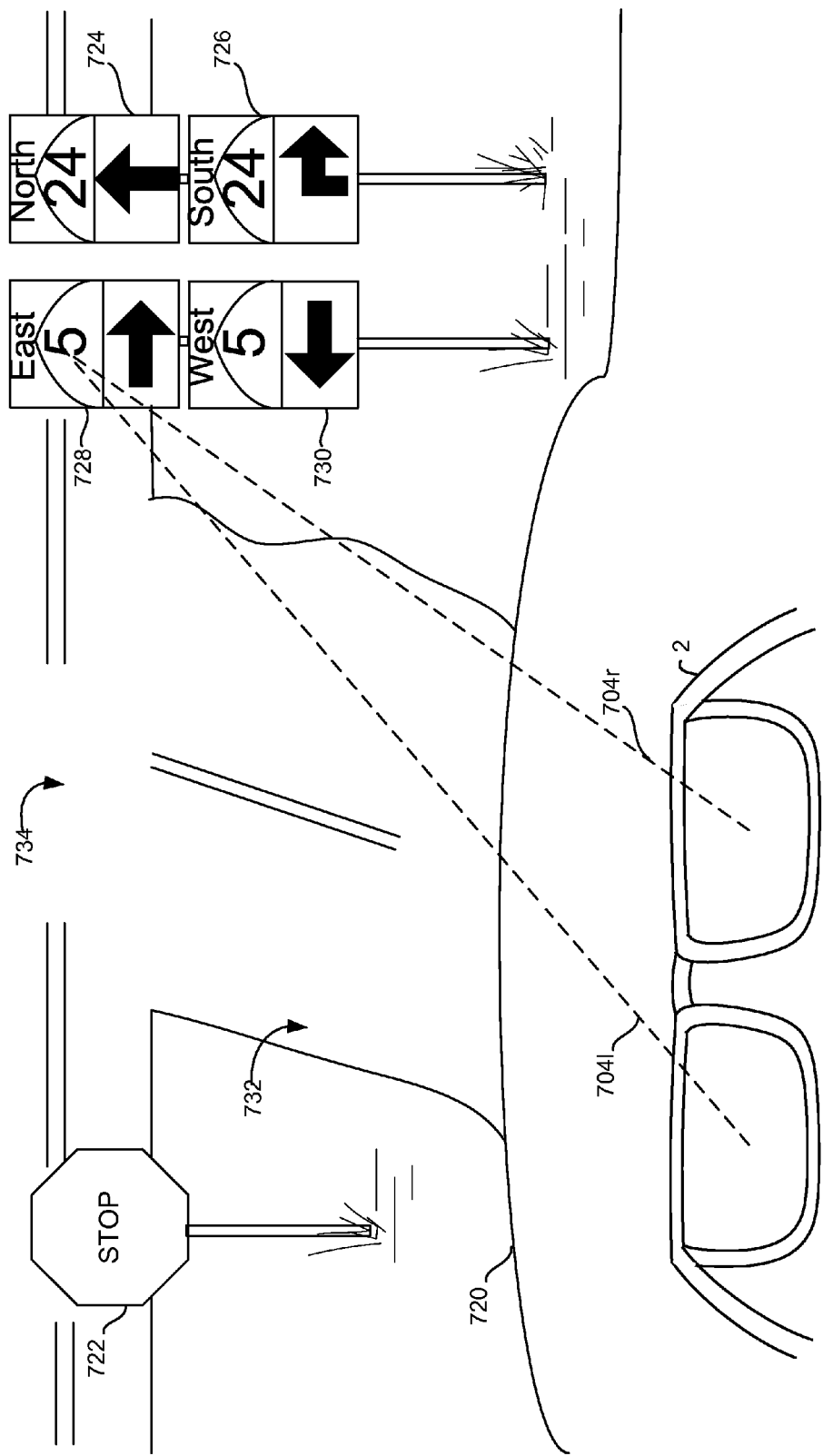
FIGS. 15A and 15B illustrates examples of causing the disappearance of real objects not satisfying relevancy criteria.
Figure 15B:
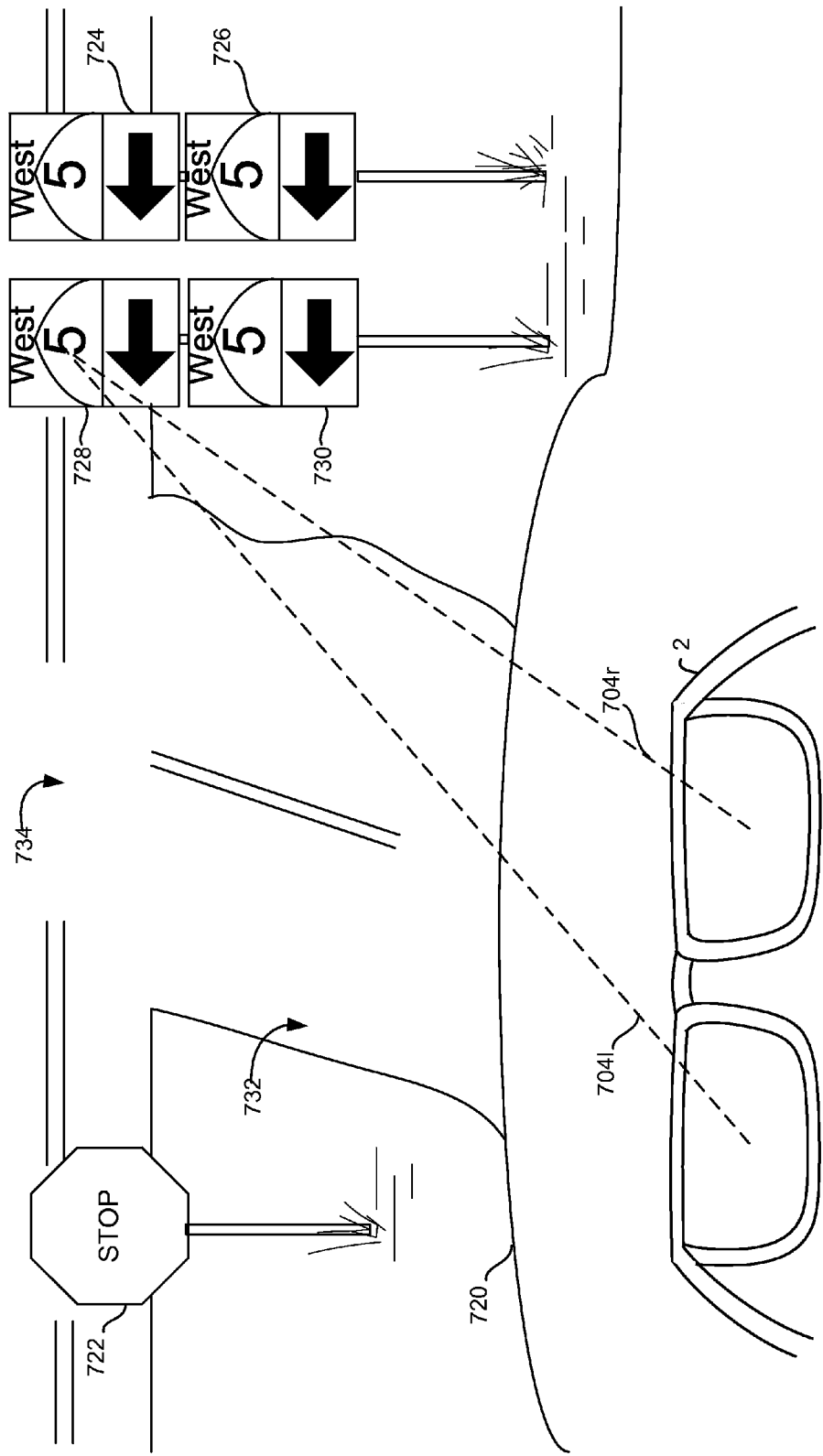

FIGS. 15A and 15B illustrates examples of causing the disappearance of real objects not satisfying relevancy criteria. In this example, a car navigation application 462 interfaces with the disappearance application 456$_1$. The car navigation application 462, based on its libraries of roads, the signs on them, and businesses and services on the roads, can notify the disappearance application 456₁ when real objects both satisfying and not satisfying relevance criteria are coming up in a specified time period and their location. Furthermore, a user may have entered one or more destinations, and the navigation system has determined a route and provides data for some of the data fields of real object meta data for real objects to be encountered on the route. Prefetching image data to local computer systems near the time of user entry into different locations is facilitated by having the user's route. FIG. 15A illustrates an example of a field of view of the see-through display looking out over a dashboard 720 while driving with no disappearance application executing for the display device 2. A user traveling on road 732 is approaching an intersection 734. There is a STOP sign 722 on the user's left, and a cluster of route number signs 728, 730, 724, 726 with directional arrows on them. The car navigation application 462 has identified Route 5 West as the next part of the user's route. In FIG. 15A, a gaze determination application 462 executing in the device 2 indicates the user is currently focused on the Route 5 East sign 728.

Instead of the user having to scan each of the signs to find the correct direction for Route 5 West, FIG. 15B illustrates how the disappearance application 456₁ can cause the irrelevant signs to disappear. In fact, the irrelevant signs are altered to assist the user in finding the relevant information more quickly. As illustrated in FIG. 15B, the road signs for 24 North (724), 24 South (726) and 5 East (728) are all overlaid in the see-through display with copies of the Route 5 West sign (730), all pointing to the left. The user spends less time trying to find the right sign to indicate where to turn. The disappearance application 456₁ may also receive real object types which the car navigation application 462 requests never to disappear, even if the user requests it. The stop sign 722 is an example of such a real object type, and safety is the reason.

Figure 16:
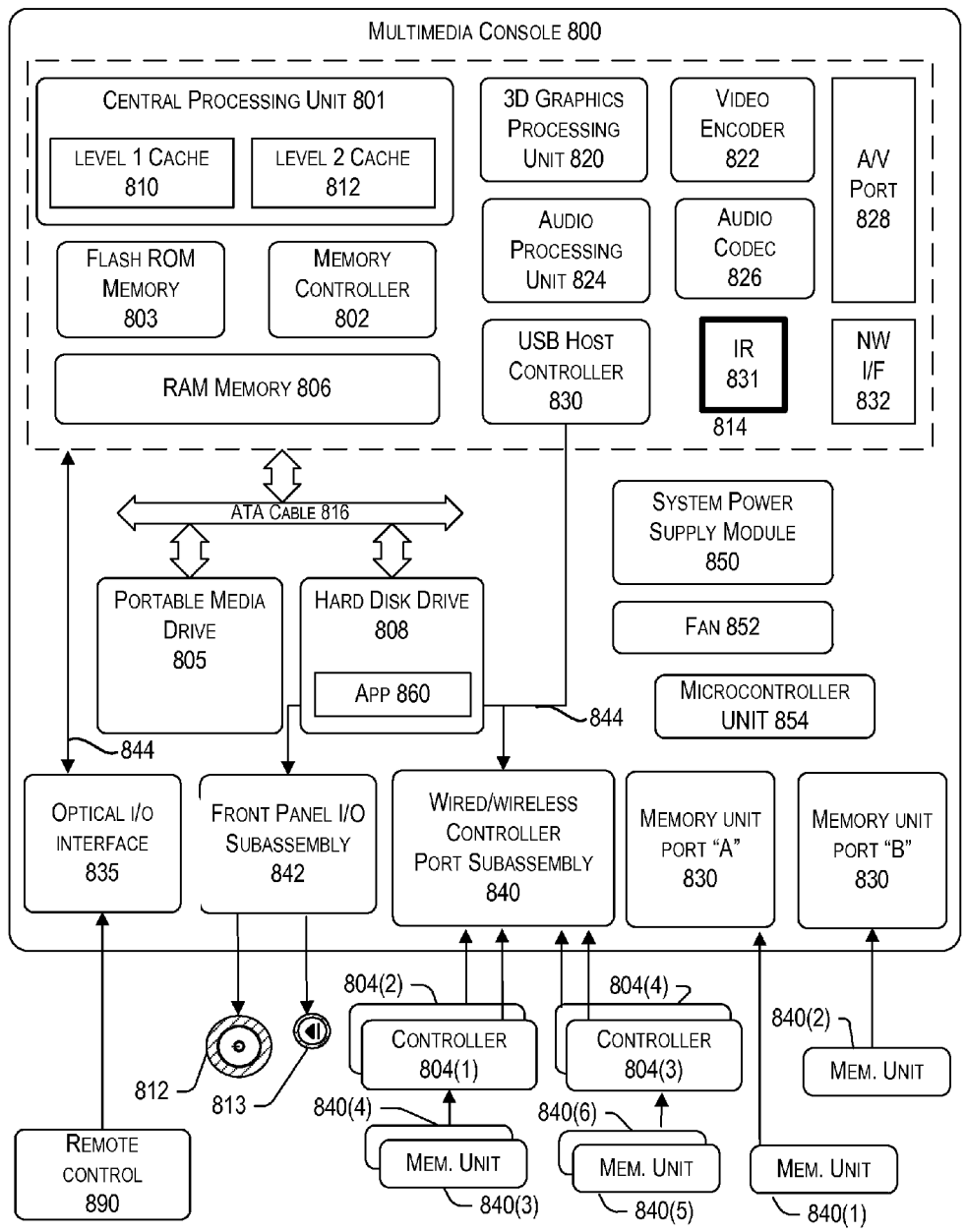
FIG. 16 is a block diagram of one embodiment of a computing system that can be used to implement a network accessible computing system hosting a disappearance application.

FIG. 16 is a block diagram of one embodiment of a computing system that can be used to implement a network accessible computing system hosting a disappearance application. For example, the embodiment of the computing system in FIG. 16 can be used to implement the computing system of FIGS. 1A and 1B. In this embodiment, the computing system is a multimedia console 800, such as a gaming console. As shown in FIG. 16, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 16 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, an RFID module, an infrared module, a WUSB module, a cable modem, and the like.

In the implementation depicted in FIG. 16 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively.

Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

Figure 17:
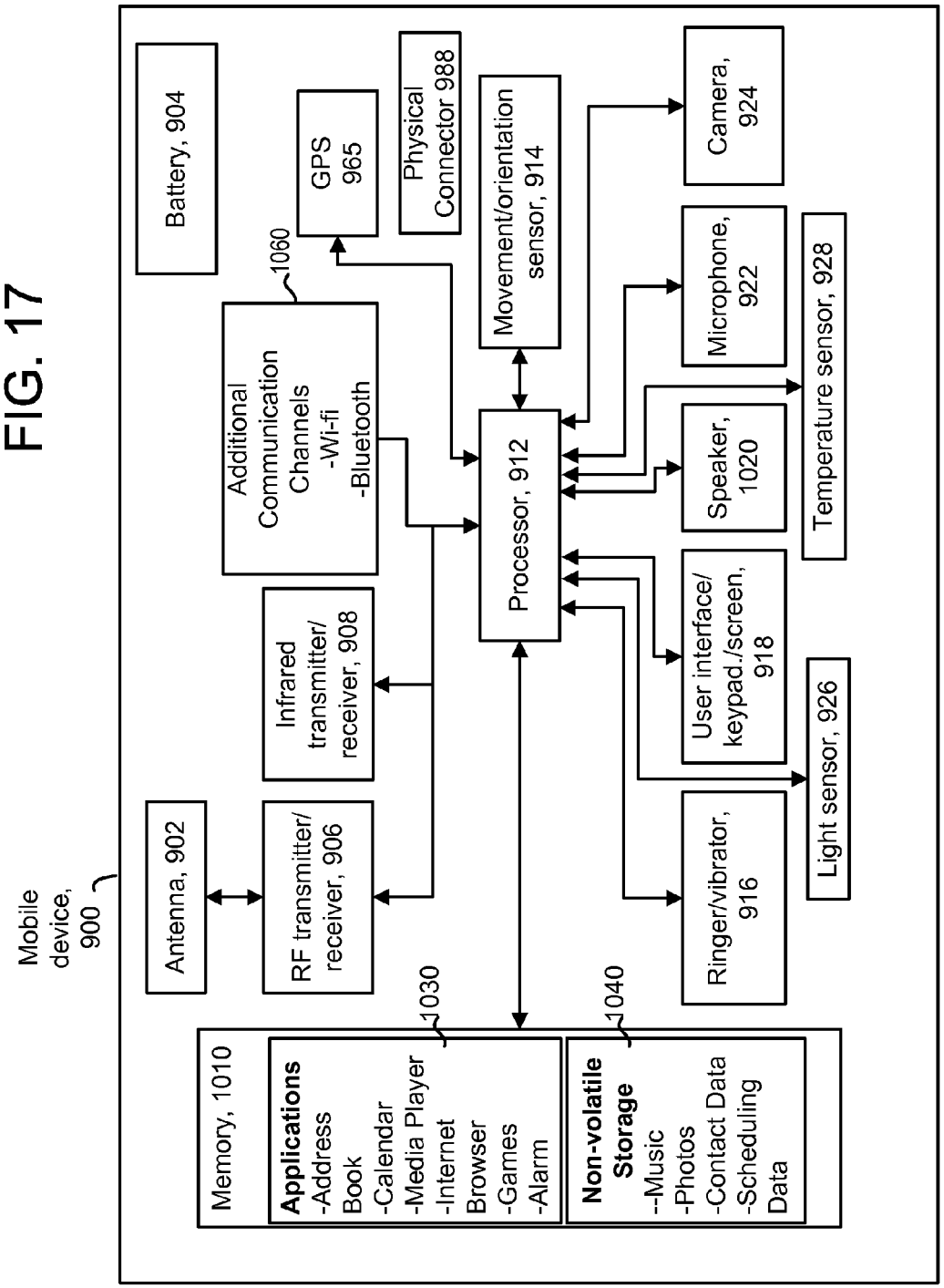
FIG. 17 is a block diagram of an exemplary mobile device which may operate in embodiments of the technology.

As discussed above, the processing unit 4 may be embodied in a mobile device 5. FIG. 17 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage devices types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like a disappearance application and image processing software for processing image data to and from the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage devices. Such media may include volatile and nonvolatile, removable and non-removable media implemented in any method or technology for storage of information such as computer readable instructions, data structures, program modules or other data. Computer storage devices includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more processor-readable storage devices having instructions encoded thereon for causing one or more processors to execute a method for causing a real object to be obscured in a see-through display of a see-through, mixed reality display device system, the method comprising:

receiving metadata identifying one or more real objects in a field of view of the see-through display;

determining whether any of the one or more real objects satisfies user disappearance criteria, the user disappearance criteria determinative of whether the one or more objects should be obscured and based on a current subject matter of interest, wherein the determining comprises:

identifying any real object type associated with the current subject matter of interest based on notification of the current subject matter of interest to a user, while the user is viewing the one or more real objects through the see-through display; and responsive to determining a first real object of the one or more real objects satisfies the user disappearance criteria, tracking image data to the first real object in the see-through display for causing the first real object to be obscured in the field of view of the see-through display by selectively controlling natural light transmissivity of each pixel of a dense grid of pixels of an opacity filter of the see-through display.

2. The one or more processor-readable storage devices of claim 1 further comprising:

detecting another see-through display device system within a predetermined distance of the see-through, mixed reality display device system;

based on being within the predetermined distance of the see-through, mixed reality display device system, receiving an identifier of a second real object which satisfies user disappearance criteria of the user wearing the other see-through display device system;

receiving image data for tracking to the second real object for an alteration technique from the other see-through display device system; and displaying the image data tracking the second real object from a perspective of the field of view of the see-through display.

3. The one or more processor-readable storage devices of claim 1 wherein determining whether any of the one or more real objects satisfies user disappearance criteria further comprises:

identifying any real object in the field of view of the see-through display matching any identified real object type; and determining whether any identified real object does not satisfy relevance criteria for the current subject matter of interest.

4. The one or more processor-readable storage devices of claim 3 wherein determining whether any identified real object does not satisfy relevance criteria for the current subject matter of interest further comprises:

applying a keyword search technique to the metadata of any real object identified as matching any identified real object type for determining a respective keyword relevancy score; and identifying any real object not satisfying relevance criteria for the current subject matter of interest based on the respective keyword relevancy score.

5. The one or more processor-readable storage devices of claim 1 wherein the method further comprises:

determining a position of each real object identified as satisfying user disappearance criteria within the field of view of the see-through display;

identifying a visibility level for each identified real object based on its respective determined position, and a predetermined visibility distance for a location of the display device; and prioritizing each real object for disappearance based on its identified visibility level in the field of view.

6. The one or more processor-readable storage devices of claim 5 wherein the method further comprises:

determining a trajectory of each real object identified as satisfying user disappearance criteria within the field of view of the see-through display; and wherein identifying the visibility level for each identified real object is also based on its respective determined trajectory.

7. The one or more processor-readable storage devices of claim 5 wherein identifying the visibility level for each identified real object is also based on at least one appearance characteristic of each real object identified as satisfying user disappearance criteria within the field of view of the see-through display.

8. The one or more processor-readable storage devices of claim 5 wherein tracking image data to the first real object in the see-through display for causing disappearance of the first real object in the field of view of the see-through display further comprises:

selecting an alteration technique for each real object to be obscured by alteration techniques indicated for the respective real object based on a priority of the visibility level identified for each of the real objects; and applying the selected alteration technique for each real object for disappearance.

9. The one or more processor-readable storage devices of claim 1 further comprising:

checking for identification of any real object satisfying user disappearance criteria which is outside the field of view but within a predetermined visibility distance for a location of the display device system; and prefetching any applicable disappearance image data for any identified real object satisfying user disappearance criteria which is outside the field of view but within the predetermined visibility distance for the location of the display device system.

10. The one or more processor-readable storage devices of claim 9 further comprising:

applying a location prediction method for identifying one or more subsequent locations for entry by the display device system;

responsive to identifying a subsequent location, checking for identification of any real object satisfying user disappearance criteria in the subsequent location based on stored real object metadata associated with the subsequent location; and prefetching any applicable disappearance image data for any identified real object satisfying user disappearance criteria in the subsequent location.

11. A see-through, head mounted, mixed reality display device system for causing a real object to be obscured in a field of view of a see-through display of the display device system comprising:

an opacity filter selectively controlling natural light transmissivity of each pixel of a dense grid of pixels and blocking natural light from passing through a light guide optical element to obscure elements in the field of view;

one or more location detection sensors;

a memory for storing user disappearance criteria including at least one subject matter item to be selectively obscured from view through the see-through display;

one or more processors having access to the memory and configured to receive a notification of the at least one subject matter item while a user is viewing the real object through the see-through display, the one or more processors communicatively coupled to the one or more location detection sensors for receiving location identifier data for the display device system and for identifying one or more real objects in the field of view of the see-through display which are related to the at least one subject matter item and within a predetermined visibility distance for a location determined from the location identifier data; and at least one image generation unit communicatively coupled to the one or more processors and optically coupled to the see-through display for tracking image data to the identified one or more real objects in the field of view of the see-through display for causing the one or more real objects to be selectively obscured from view through the see-through display by utilizing the opacity filter.

12. The system of claim 11 further comprising:

the user disappearance criteria being stored in the memory further comprising a replacement object for a real world object type associated with the at least one subject matter item.

13. The system of claim 11 wherein the user disappearance criteria includes an alteration indicator for a real world object type associated with the at least one subject matter item, the alteration indicator indicating a type of alteration to be applied to the respective real world object.

14. The system of claim 11 wherein the one or more processors are communicatively coupled to a remote computing system for accessing a three-dimensional model including metadata identifying one or more real objects in the location within a predetermined visibility distance of the see-through, mixed reality display device.

15. The system of claim 11 wherein the one or more location detection sensors comprise at least one of the following:
- a WiFi device;
- an infrared device;
- an image capture device;
- a Global Positioning System (GPS) device;
- a cellular telecommunication based device; and
- a RFID device.

16. The system of claim 11 wherein the one or more processors having access to user profile data for predicting a subsequent location to a current location of the display device;

the one or more processors checking for identification of any real object satisfying user disappearance criteria in the subsequent location;

the one or more processors being communicatively coupled to a computer system in the subsequent location; and the one or more processors prefetching image data for any identified real object satisfying user disappearance criteria in the subsequent location by scheduling downloading to the computer system in the subsequent location in time for arrival of the user.

17. A method for causing a real object to be obscured in a field of view of a see-through display of a see-through mixed reality display device system comprising:

receiving user input of a physical action identifying subject matter to be selectively obscured, while a user is viewing a real object through the see-through display, the subject matter including the real object currently in the field of view of the see-through display;

storing the subject matter to be selectively obscured as user disappearance criteria;

tracking image data to the real object to be selectively obscured in accordance with an alteration technique; and responsive to identifying a user designated alteration technique to be applied to the real object, selecting the user designated alteration technique as the alteration technique and causing the real object to be selectively obscured from the current field of view through the see-through display by selectively controlling natural light transmissivity of each pixel of a dense grid of pixels of an opacity filter of the see-through display.

18. The method of claim 17 wherein the alteration technique includes at least one of the following:

replacement of the real object with a virtual object;

erasure of the real object by overlaying the real object with image data generated by blending image data of objects surrounding the real object;

redaction of the real object with black image data; and obscuring of the real object by tracking blur image data to the first real object.

19. The method of claim 17 wherein the alteration technique includes erasure of the real object and the method further comprises:

tracking a position of the see-through, mixed reality display device to the real object by monitoring image data from physical environment facing cameras of the see-through, mixed reality display device system; and responsive to detecting the see-through, mixed reality display device and the real object are within a collision distance, outputting a safety warning.

20. The method of claim 17 wherein the user input of a physical action identifying subject matter to be obscured is a gesture identified based on image data from at least one physical environment facing camera of the see-through, mixed reality display device system.

* * * * *